United States Patent
Gusev

(10) Patent No.: US 9,157,989 B2
(45) Date of Patent: Oct. 13, 2015

(54) DISTANCE MEASUREMENT METHODS AND APPARATUS

(75) Inventor: Yuri P. Gusev, Aelvesjoe (SE)

(73) Assignee: TRIMBLE AB, Danderyd (SE)

( * ) Notice: Subject to any disclaimer, the term of this patent is extended or adjusted under 35 U.S.C. 154(b) by 129 days.

(21) Appl. No.: 13/597,295

(22) Filed: Aug. 29, 2012

(65) Prior Publication Data
US 2014/0063482 A1 Mar. 6, 2014

(51) Int. Cl.
*G01C 3/08* (2006.01)
*G01S 7/486* (2006.01)
*G01S 17/10* (2006.01)
*G01S 7/489* (2006.01)
*G01S 7/484* (2006.01)

(52) U.S. Cl.
CPC .............. *G01S 7/4868* (2013.01); *G01S 7/489* (2013.01); *G01S 17/10* (2013.01); *G01S 7/484* (2013.01)

(58) Field of Classification Search
CPC ....... G01S 7/4868; G01S 17/10; G01S 7/489; G01S 7/484; G02B 6/3594; G01C 3/08
USPC ........................................................ 356/4.07
See application file for complete search history.

(56) References Cited

U.S. PATENT DOCUMENTS

| | | | | |
|---|---|---|---|---|
| 4,498,764 | A | * | 2/1985 | Bolkow et al. ............... 356/5.06 |
| 4,994,811 | A | | 2/1991 | Moreira |
| 5,303,020 | A | * | 4/1994 | Croteau ........................ 356/5.01 |
| 5,362,970 | A | | 11/1994 | Pryor et al. |
| 5,877,851 | A | | 3/1999 | Stann et al. |
| 6,665,056 | B2 | | 12/2003 | Shirai et al. |
| 2003/0103197 | A1 | * | 6/2003 | Shirai et al. .................. 356/5.01 |
| 2007/0097350 | A1 | * | 5/2007 | Halama ........................ 356/4.07 |
| 2010/0195088 | A1 | | 8/2010 | D'Aligny et al. |
| 2012/0140203 | A1 | | 6/2012 | Gusev |

FOREIGN PATENT DOCUMENTS

| | | |
|---|---|---|
| EP | 0 848 495 A2 | 6/1998 |
| WO | 2009/039875 A1 | 4/2009 |
| WO | 2010020267 A1 | 2/2010 |
| WO | 2010/149219 A1 | 12/2010 |
| WO | 2010149219 A1 | 12/2010 |
| WO | 2011/000411 A1 | 1/2011 |

OTHER PUBLICATIONS

Communication pursuant to Article 94(3) EPC in Application No. 09 779 974.6-1812, dated May 8, 2013, 4 pp.
International Search Report and Written Opinion of the International Searching Authority, dated Nov. 7, 2013, in International Application No. PCT/EP2013/063184 (13 pages).

* cited by examiner

*Primary Examiner* — Isam Alsomiri
*Assistant Examiner* — Vicente Rodriguez
(74) *Attorney, Agent, or Firm* — Kilpatrick Townsend & Stockton LLP

(57) ABSTRACT

Methods and apparatus are presented for distance measurement using laser pulses in which at least one of an attenuation function and an offset of the attenuation function relative to the send pulse is variable to accommodate differing measurement needs. In some embodiments, at least one of an attenuation function and an offset of the attenuation function is fixed relative to the send pulse for some number of measurement cycles and information derived from the result is used to modify either or both of the attenuation function and offset of the attenuation function relative to the send pulse for subsequent measurement.

34 Claims, 24 Drawing Sheets

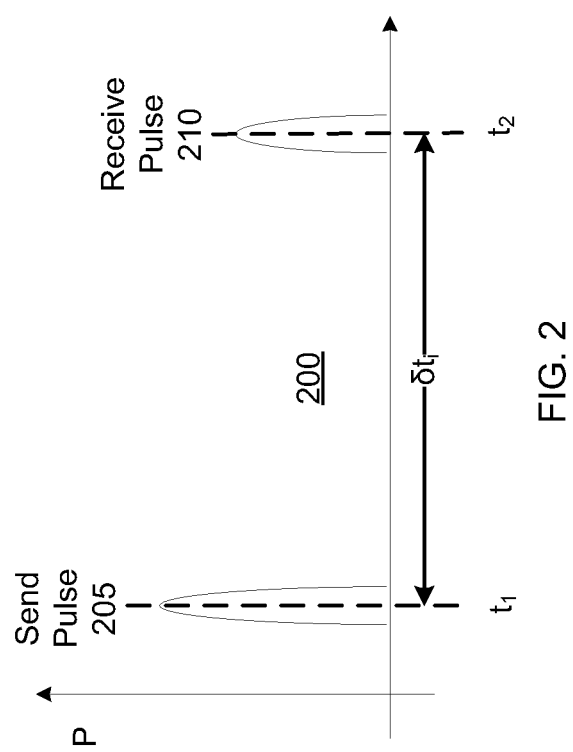

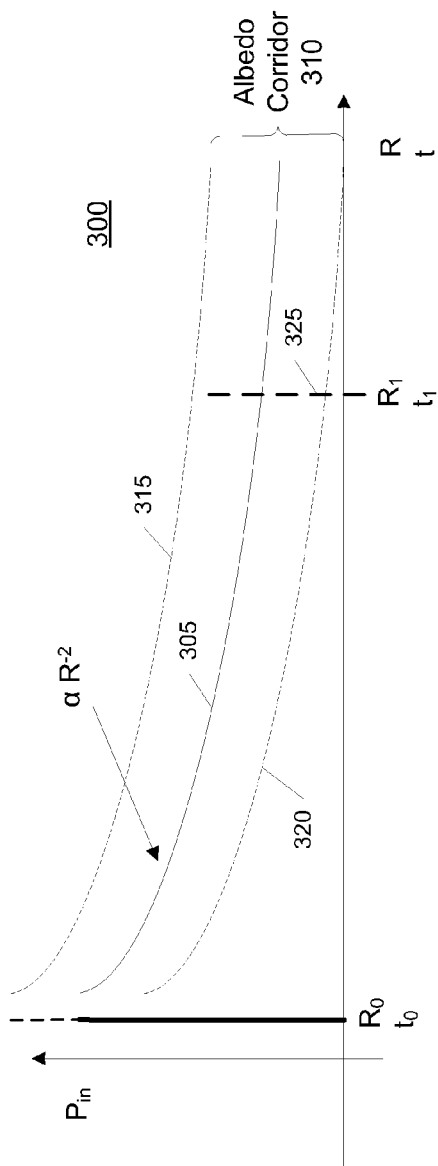
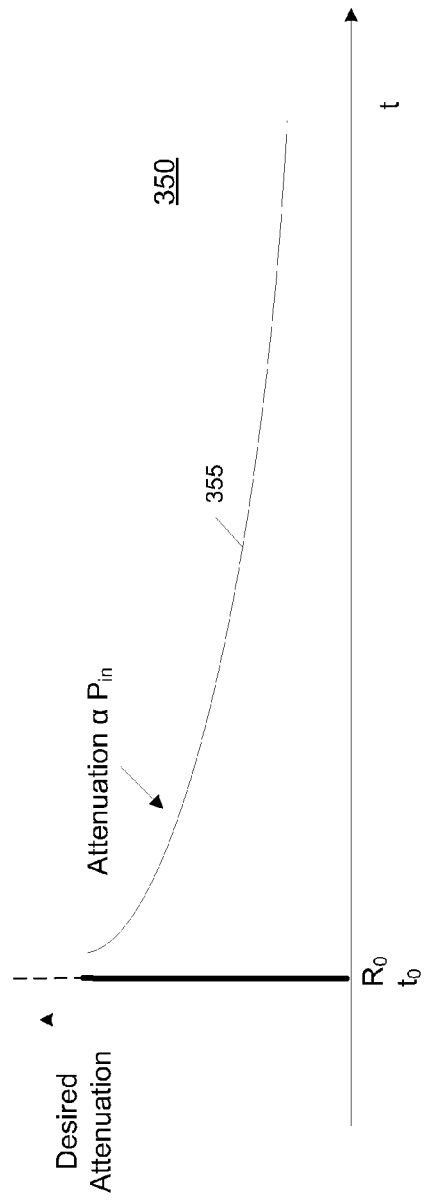
FIG. 3A
FIG. 3B

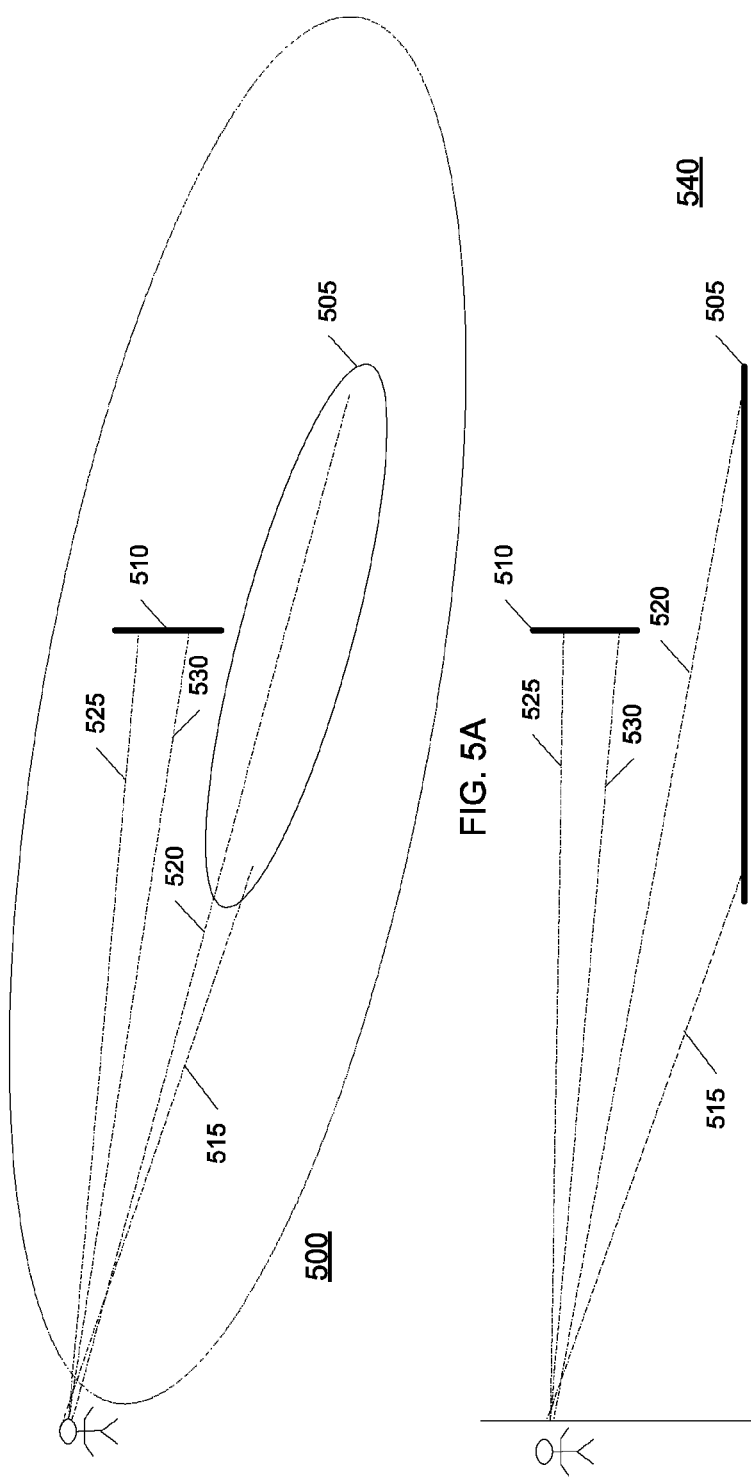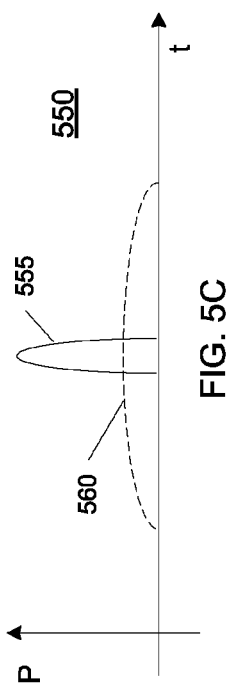

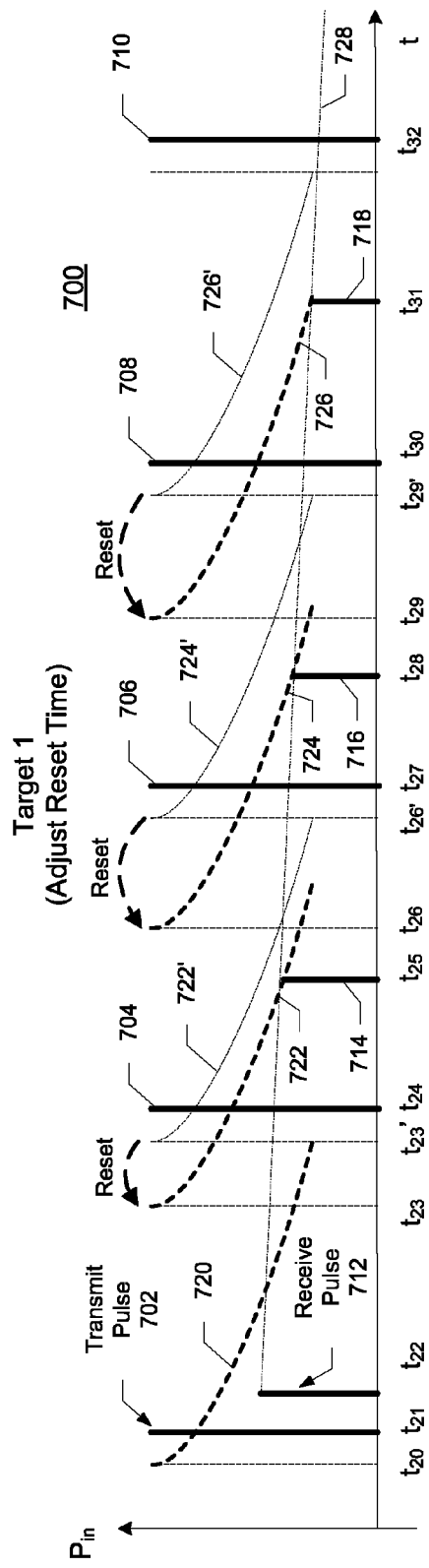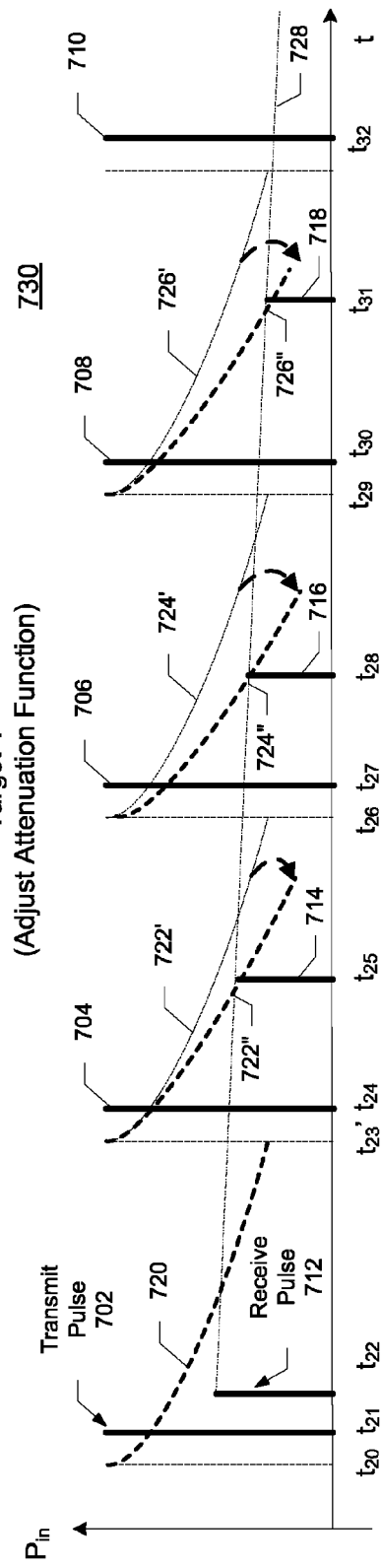

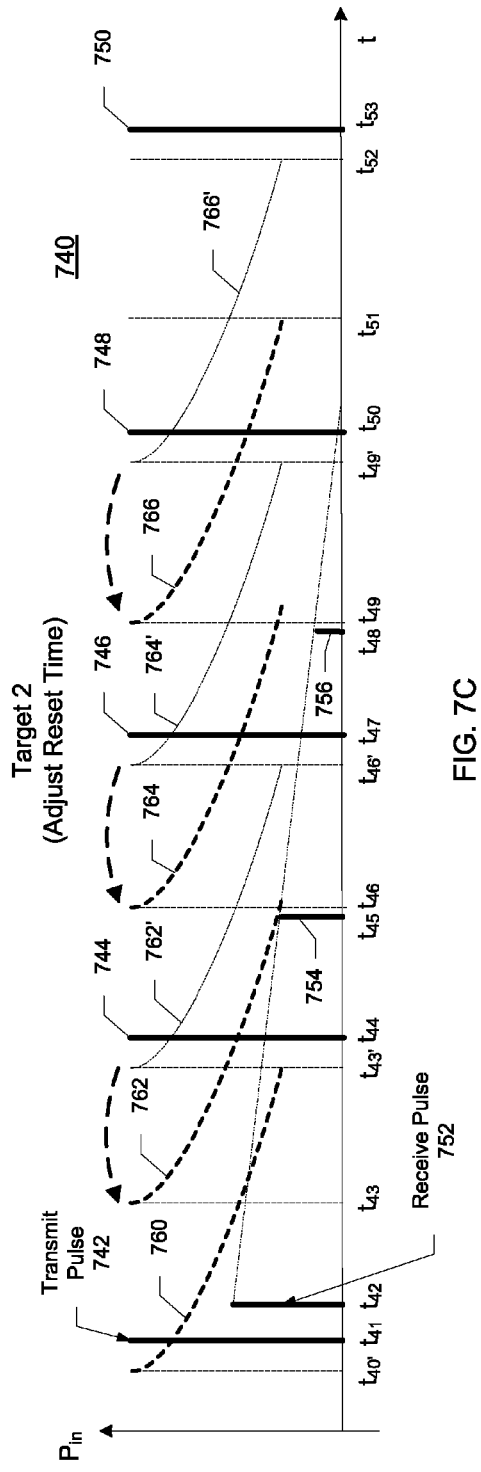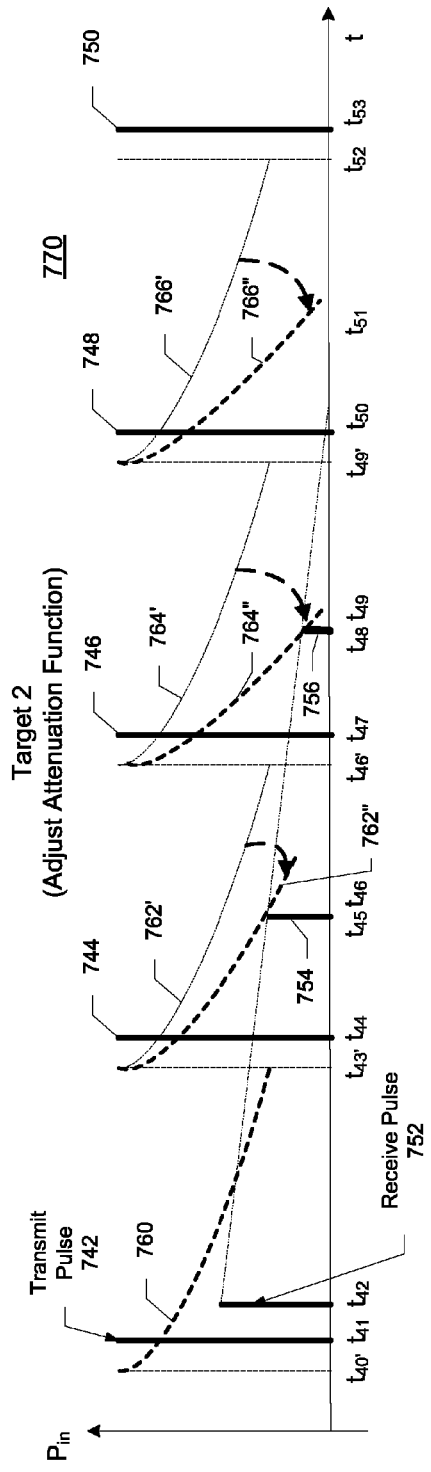

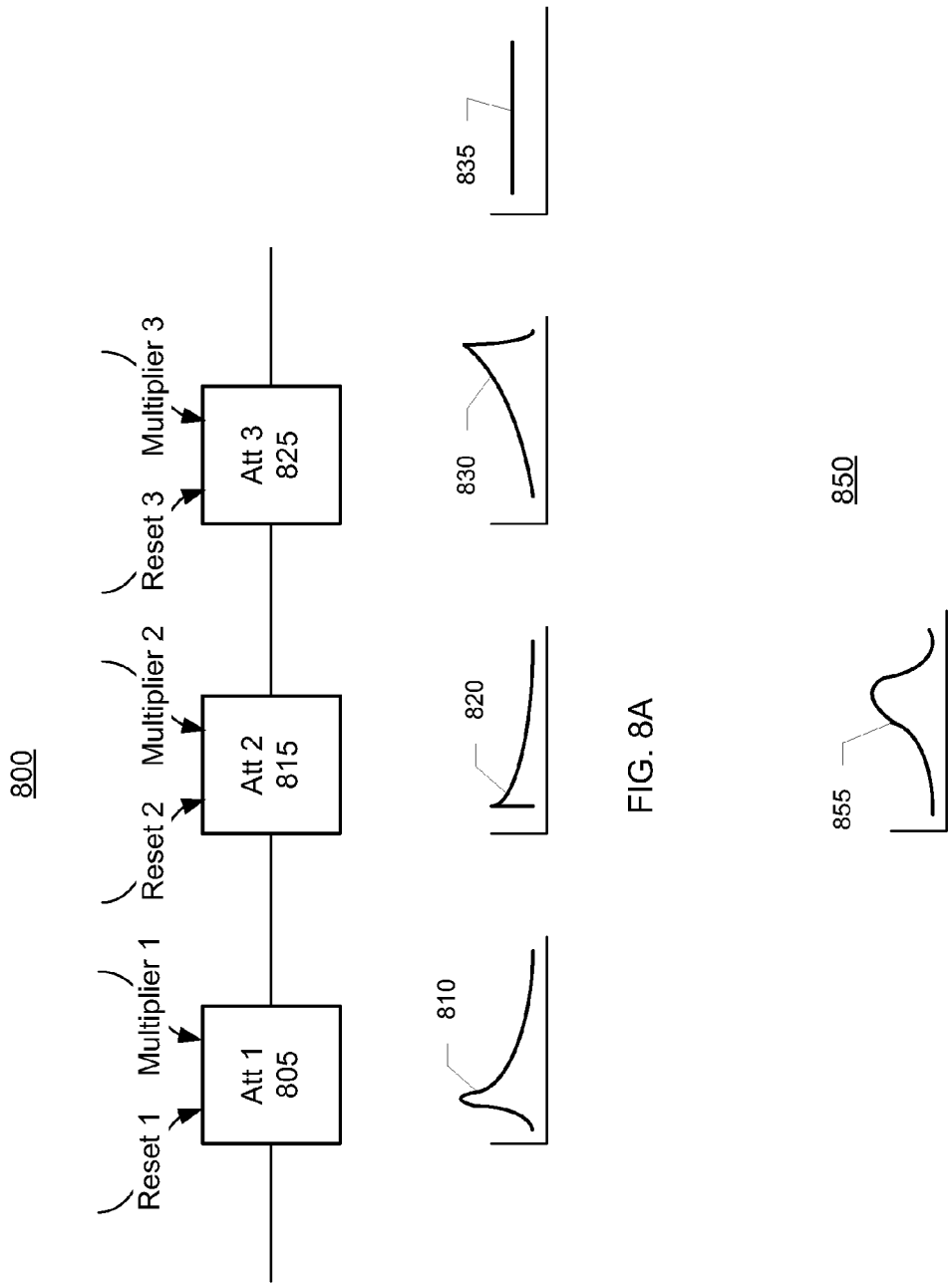

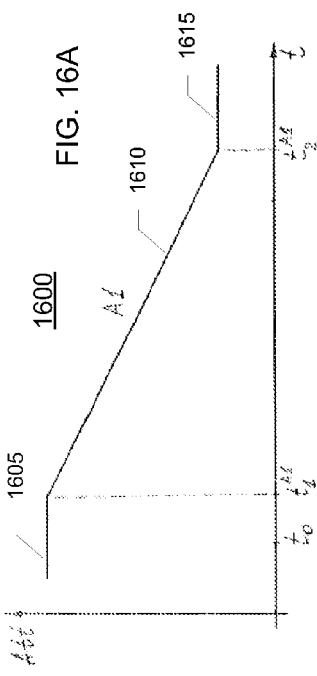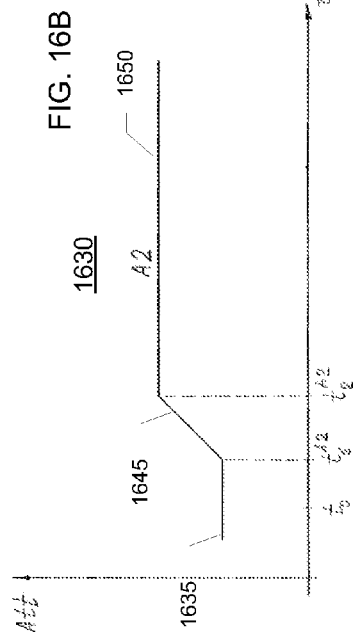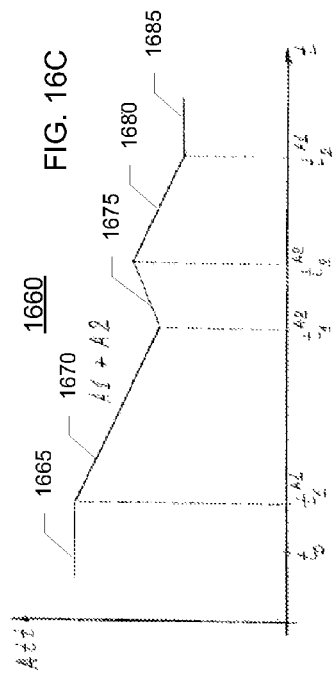

DISTANCE MEASUREMENT METHODS AND APPARATUS

CROSS REFERENCE TO RELATED APPLICATIONS

The following are related hereto and incorporated herein in their entirety by this reference:

International Patent Application Publication WO 2011/000411 A1 published 6 Jan. 2011; International Patent Application Publication WO 2010/149219 A1 published 29 Dec. 2010; US Patent Application Publication 2010/195088 A1 published 5 Aug. 2010; and International Patent Application Publication WO 2009/039875 A1 published 2 Apr. 2009.

TECHNICAL FIELD

The present invention relates to the field of electronic distance measurement. More particularly, the present invention relates to methods and apparatus for electronic distance measurement using selectable parameters for detecting laser pulses.

BACKGROUND ART

In time-of-flight distance measurement, the time delay between emission and reception of a laser pulse allows for distance calculation. The emitted pulse travels to a reflector and back to a detector where it is received. The time delay is proportional to the pulse travel distance. For a given reflector, the power level of the received pulse is assumed to be inversely proportional to the square of the pulse travel time (and the pulse travel distance) within a range of interest. The dynamic range of the power level of received pulses thus can be quite large. To accommodate this dynamic range, prior art systems apply an attenuation function such that detection sensitivity increases over time following emission of a send pulse.

However, typical prior art systems use an attenuation function based on a fixed function which has a fixed timing relative to the send pulse.

A consequence of this is a lack of adaptability to various measurement scenarios.

SUMMARY

Electronic distance measurement methods and apparatus having greater adaptability are provided in accordance with embodiments of the present invention.

Some embodiments in accordance with the invention provide for distance measurement using laser pulses in which at least one of an attenuation function and an offset of the attenuation function relative to the send pulse is variable to accommodate differing measurement needs. The attenuation function determines detection sensitivity over a detection interval, while the offset determines timing of the attenuation function relative to the send pulse.

Some embodiments provide for fixing at least one of an attenuation function and an offset of the attenuation function relative to the send pulse for some number of measurement cycles and using information derived from the result to modify either or both of the attenuation function and offset of the attenuation function relative to the send pulse for subsequent measurement.

Some embodiments provide a method of measuring distances, comprising: selecting measurement parameters, including an attenuation function, an attenuation start time, an attenuation reset time, and an emission time; transmitting a light pulse at the emission time and starting the attenuation function at the attenuation start time; detecting if a return pulse is received within a maximum measurable time; if a return pulse is not received within the maximum measurable time, restarting the process, and if a return pulse is received within the maximum measurable time, using at least one characteristic of the return pulse to determine a measured distance, comparing at least one characteristic of the return pulse with at least one defined limit to determine whether to modify at least one of the measurement parameters and, if yes, modifying at least one of the measurement parameters for conducting a further measurement, and conducting the further measurement.

In some embodiments the selected emission time is prior to the attenuation start time.

In some embodiments the selected emission time is later than the attenuation start time.

In some embodiments, if a return pulse which exceeds a detection threshold is detected during the maximum measurable time, at least one of the measurement parameters is modified for conducting a further measurement by selecting measurement parameters which will decrease detection sensitivity for conducting the further measurement.

In some embodiments, selecting measurement parameters which will decrease detection sensitivity comprises changing at least one of the attenuation function and the time offset.

In some embodiments, if no return pulse is detected during the maximum measurable time, restarting the process comprises selecting measurement parameters which will increase detection sensitivity for conducting a subsequent measurement.

In some embodiments, selecting measurement parameters which will increase detection sensitivity comprises changing at least one of the attenuation function and the time offset.

In some embodiments, using at least one characteristic of the return pulse to determine a measured distance comprises determining a travel time between the emission time and a return-pulse receive time.

In some embodiments, using at least one characteristic of the return pulse to determine a measured distance comprises determining a return-pulse amplitude.

In some embodiments, the at least one defined limit comprises at least one of a return-pulse amplitude and an elapsed time between the emission time and a return-pulse receive time. In some embodiments, the emission time is determined by a reference pulse derived from the send pulse, and the elapsed time between the emission time and a return-pulse receive time is adjusted for a time offset between the send pulse and the reference pulse to obtain a pulse travel time.

In some embodiments, comparing at least one characteristic of the return pulse with at least one defined limit comprises determining a feature of the at least one defined limit from multiple prior measurements.

In some embodiments, determining a feature of the at least one defined limit from multiple prior measurements comprises extrapolating an approximation function from the multiple prior measurements.

In some embodiments, the approximation function is determined as an average of multiple prior measurement values.

In some embodiments, the approximation function comprises one of a straight line function, an exponential function, and a periodic function.

In some embodiments, modifying at least one of the measurement parameters comprises determining one of an optimal set of measurement parameters and an acceptable set of measurement parameters.

In some embodiments, determining an optimal set of measurement parameters comprises determining at least one measurement parameter lying near a mid-point of a range.

In some embodiments, determining an acceptable set of measurement parameters comprises determining at least one measurement parameter lying within a range.

In some embodiments, the emission time is determined such that the measurement is one of a plurality of periodic measurements.

In some embodiments, the emission time is determined such that the measurement is one of a plurality of non-periodic measurements.

Further embodiments provide apparatus for carrying out such methods.

BRIEF DESCRIPTION OF DRAWING FIGURES

These and other aspects and features of the present invention will be more readily understood from the embodiments described below with reference to the drawings, in which:

FIG. 1 schematically illustrates a system 100 for implementing a distance measurement scheme in accordance with some embodiments of the invention;

FIG. 2 shows a send pulse the corresponding receive pulse in accordance with some embodiments of the invention;

FIG. 3A shows a plot of receive pulse power as a function of time of flight of a laser pulse in accordance with some embodiments of the invention;

FIG. 3B shows time dependence of received-pulse power attenuation in accordance with some embodiments of the invention;

FIG. 5A shows in perspective view a distance-measurement scenario in accordance with some embodiments of the invention;

FIG. 5B shows in elevation view the scenario of FIG. 5A;

FIG. 5C shows an example of return pulses from differing surfaces in accordance with some embodiments of the invention;

FIG. 7A shows a pulse repetition sequence for making a series of distance measurements of a target as a function of power versus time, in accordance with some embodiments of the invention;

Figure 9A:
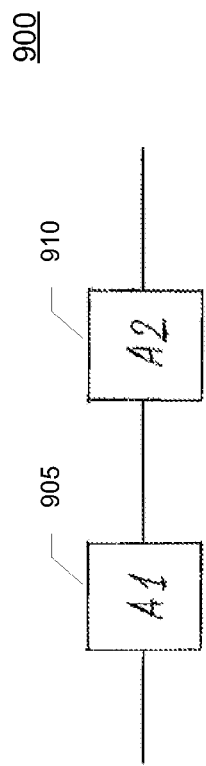
Figure 9B:
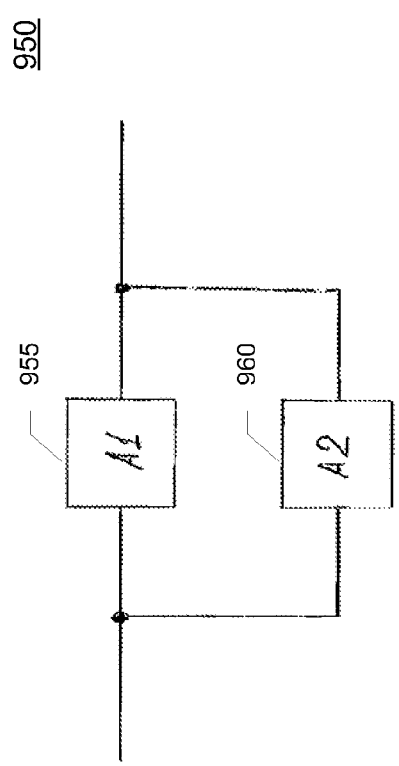
Figure 10:
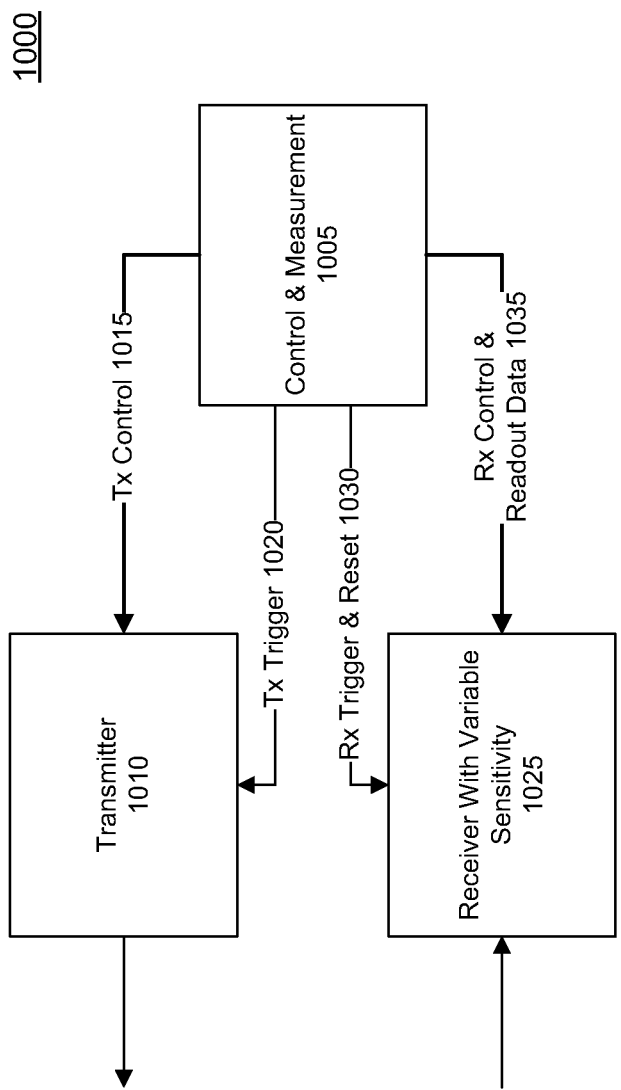
Figure 11:
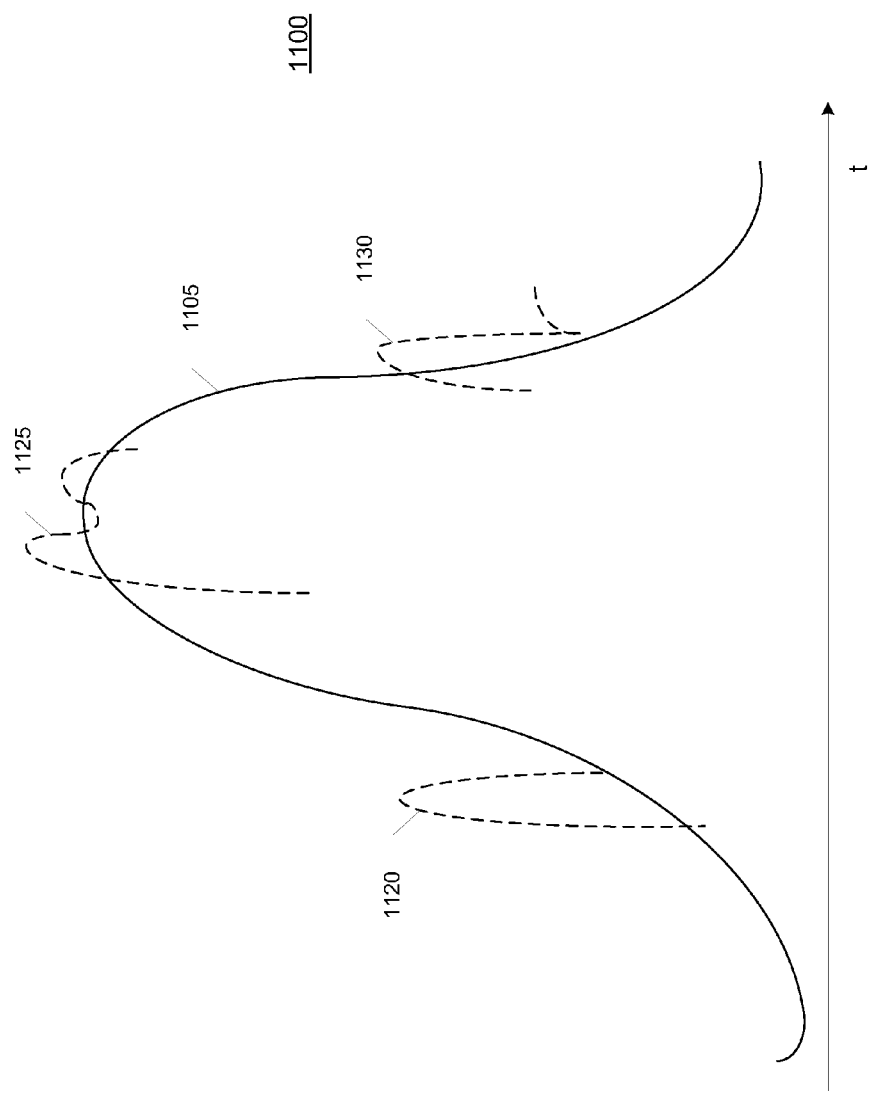
Figure 12:
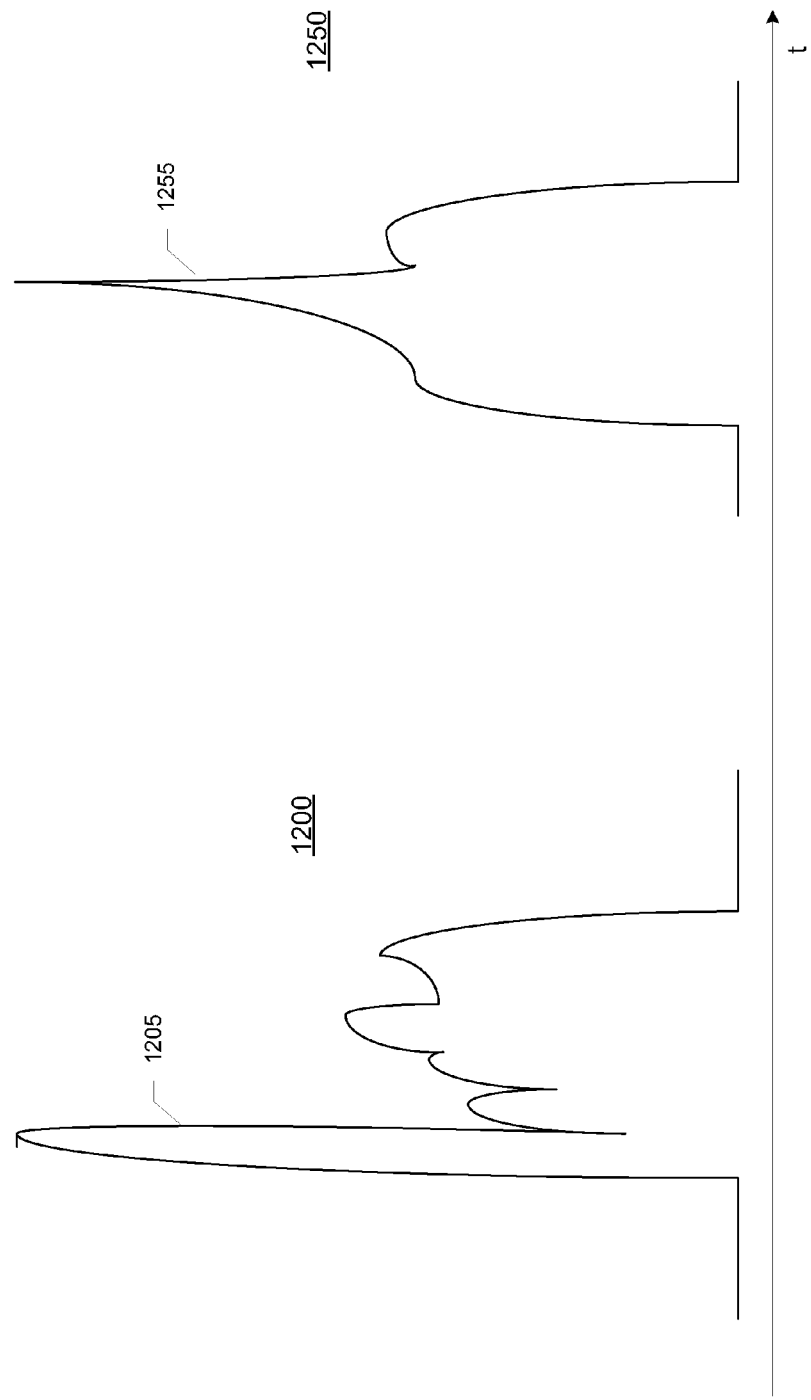
Figure 13:
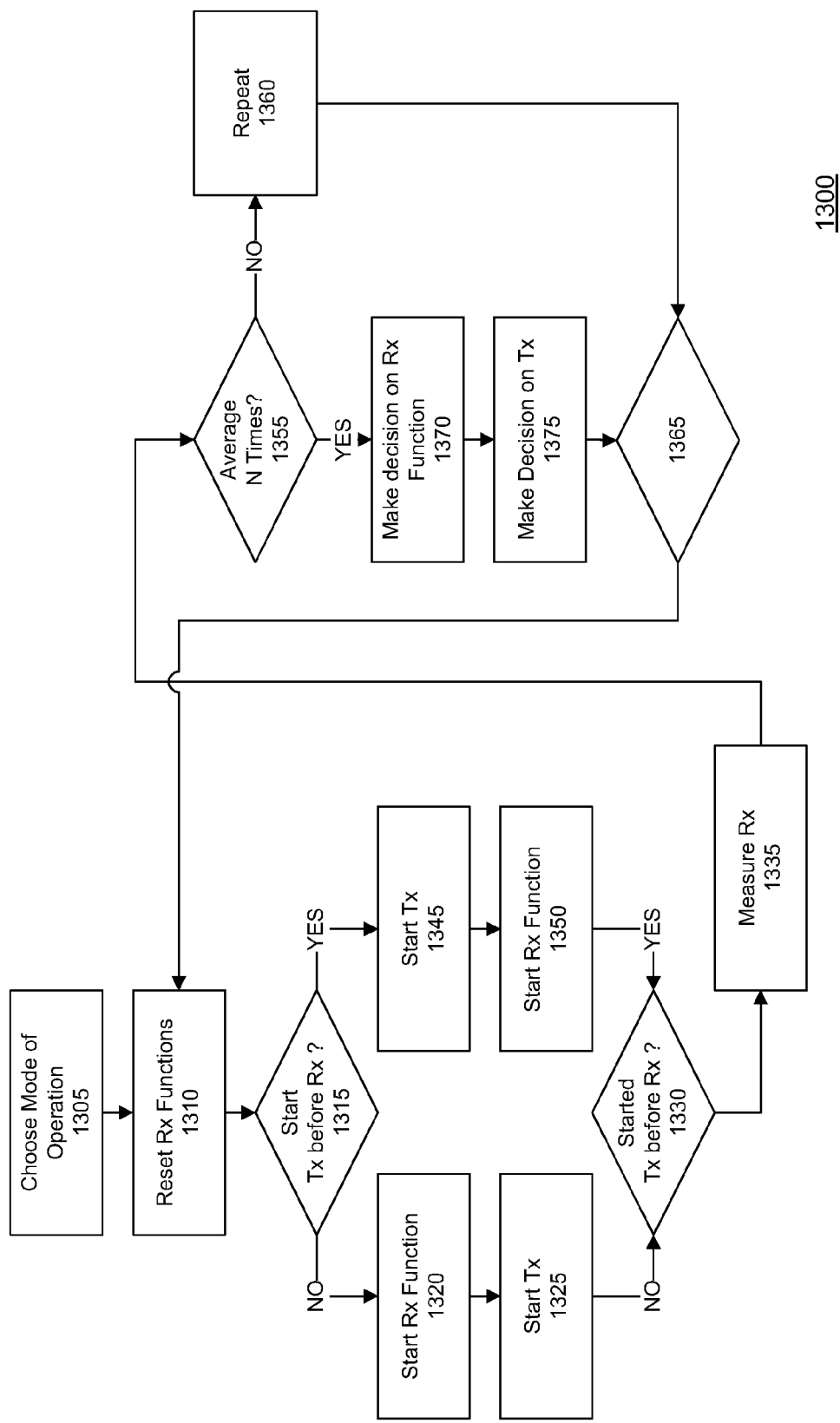
Figures 14A, 14B:
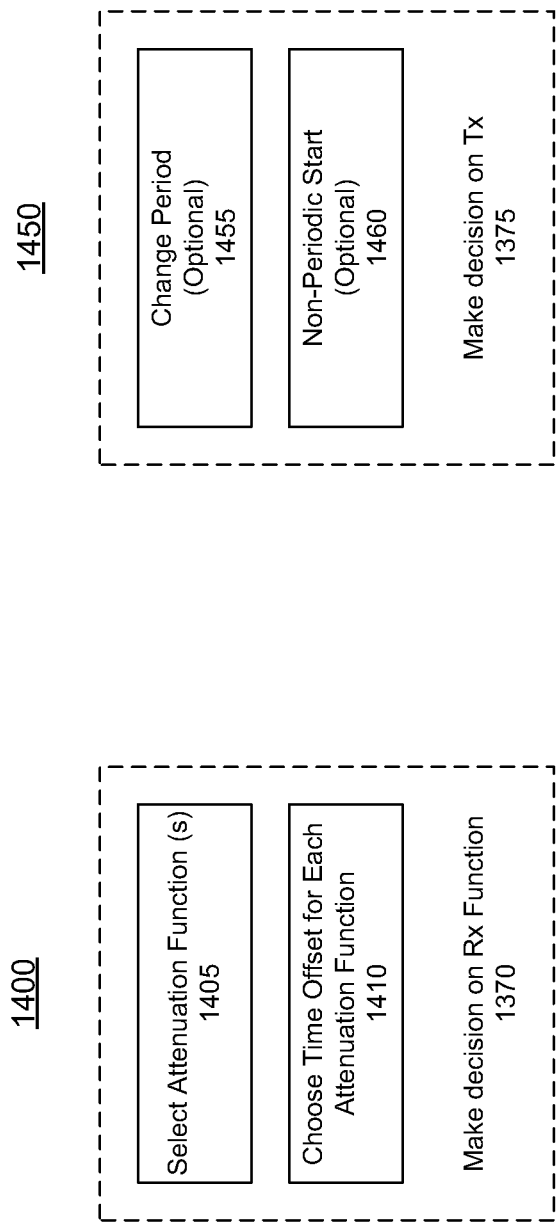
Figure 15:
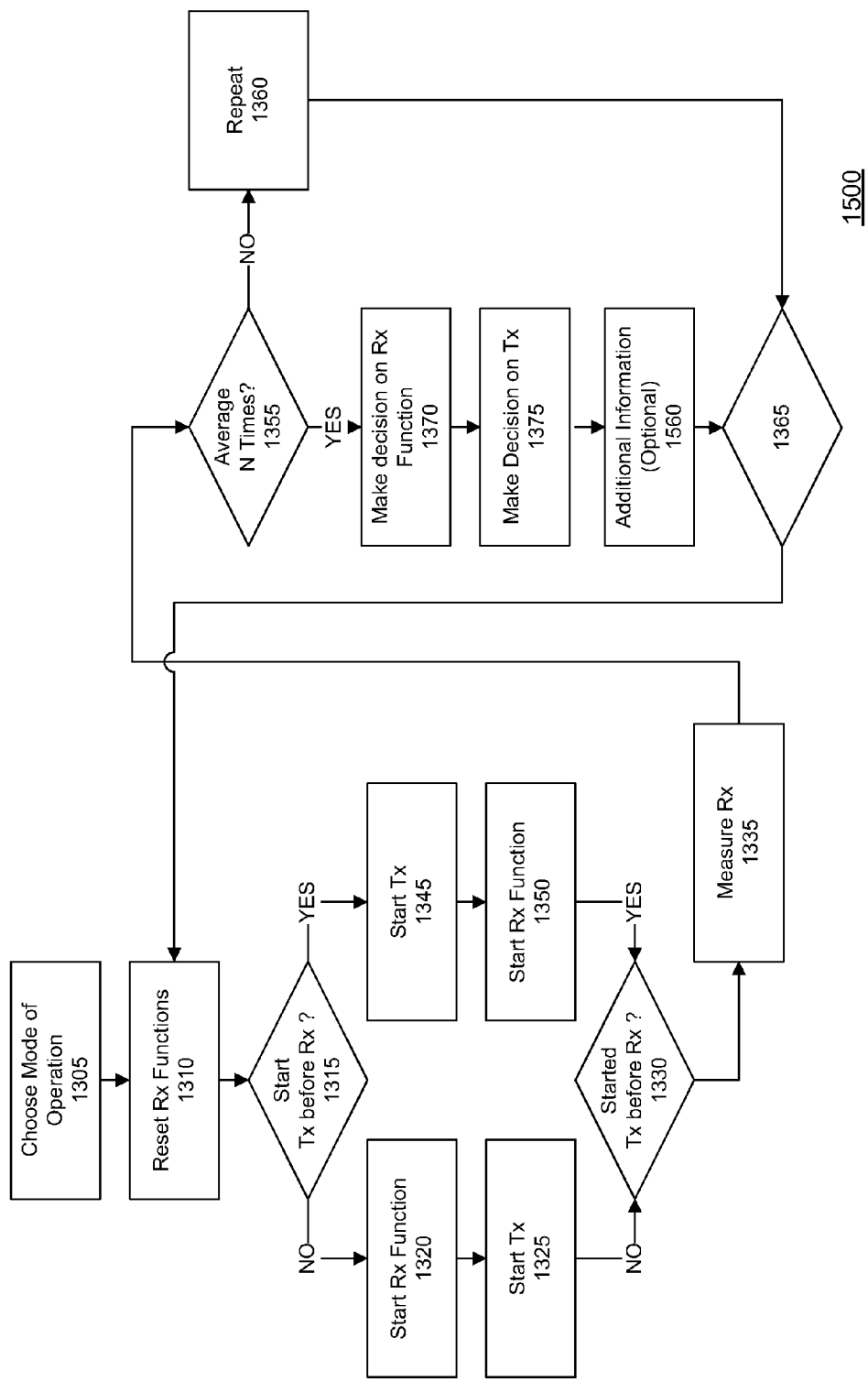
Figure 17A:
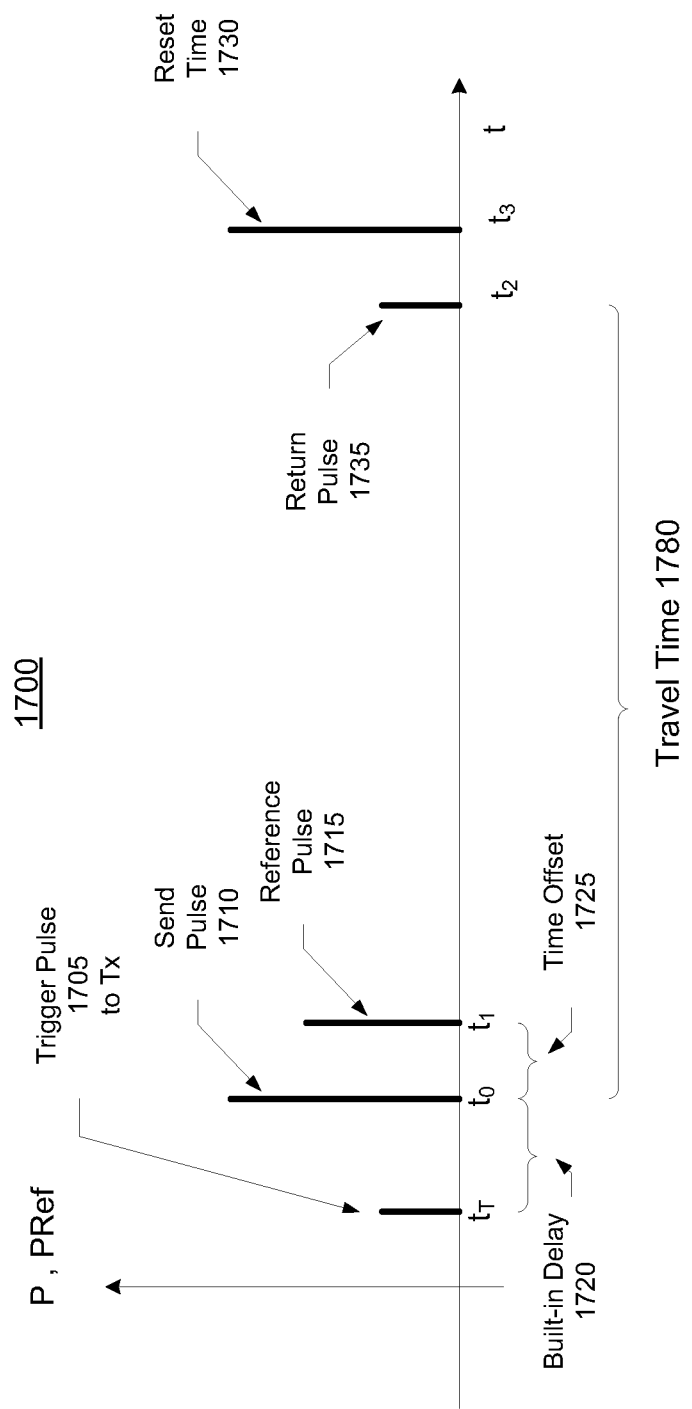
Figure 17B:
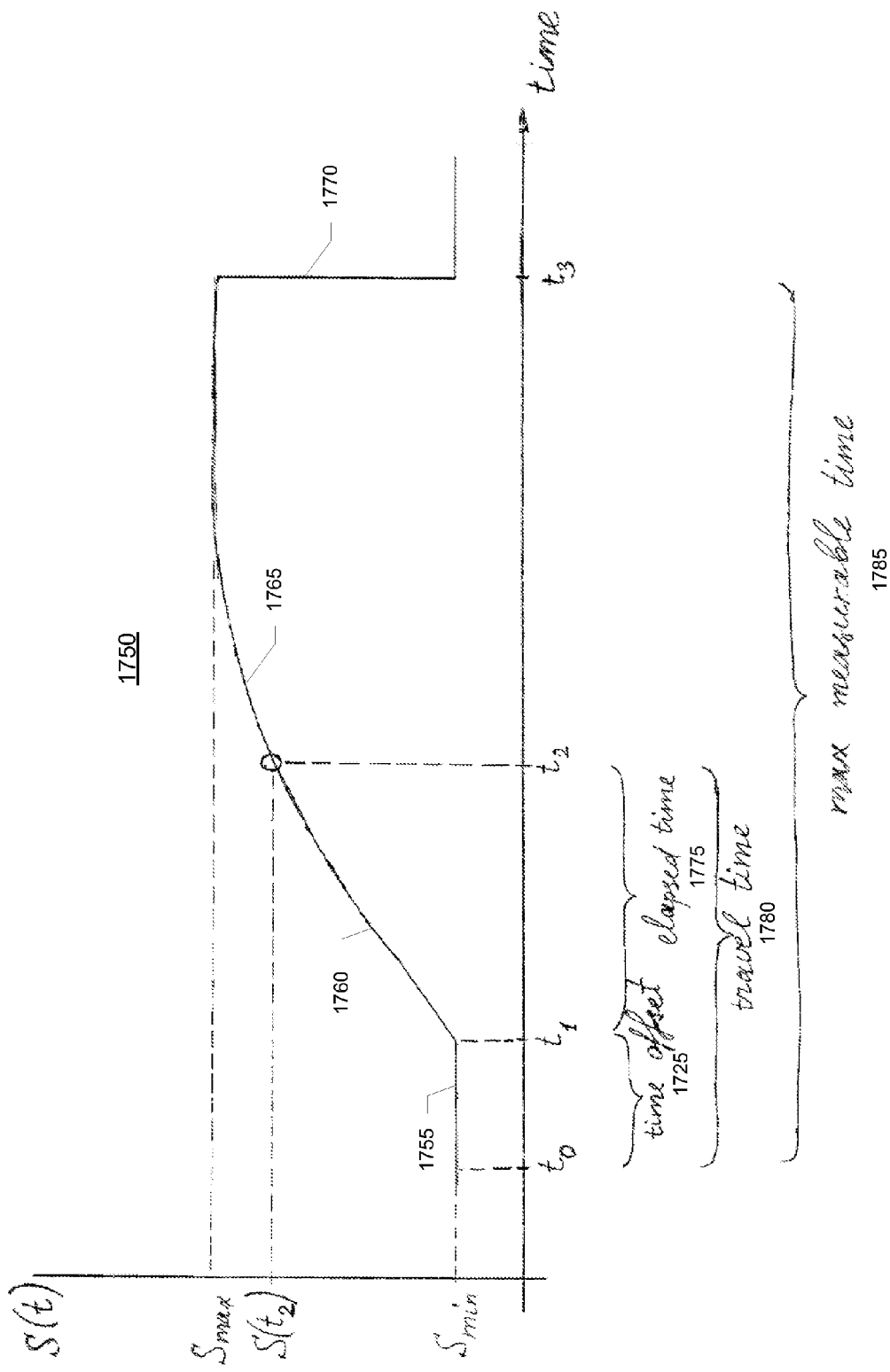
Figure 18:
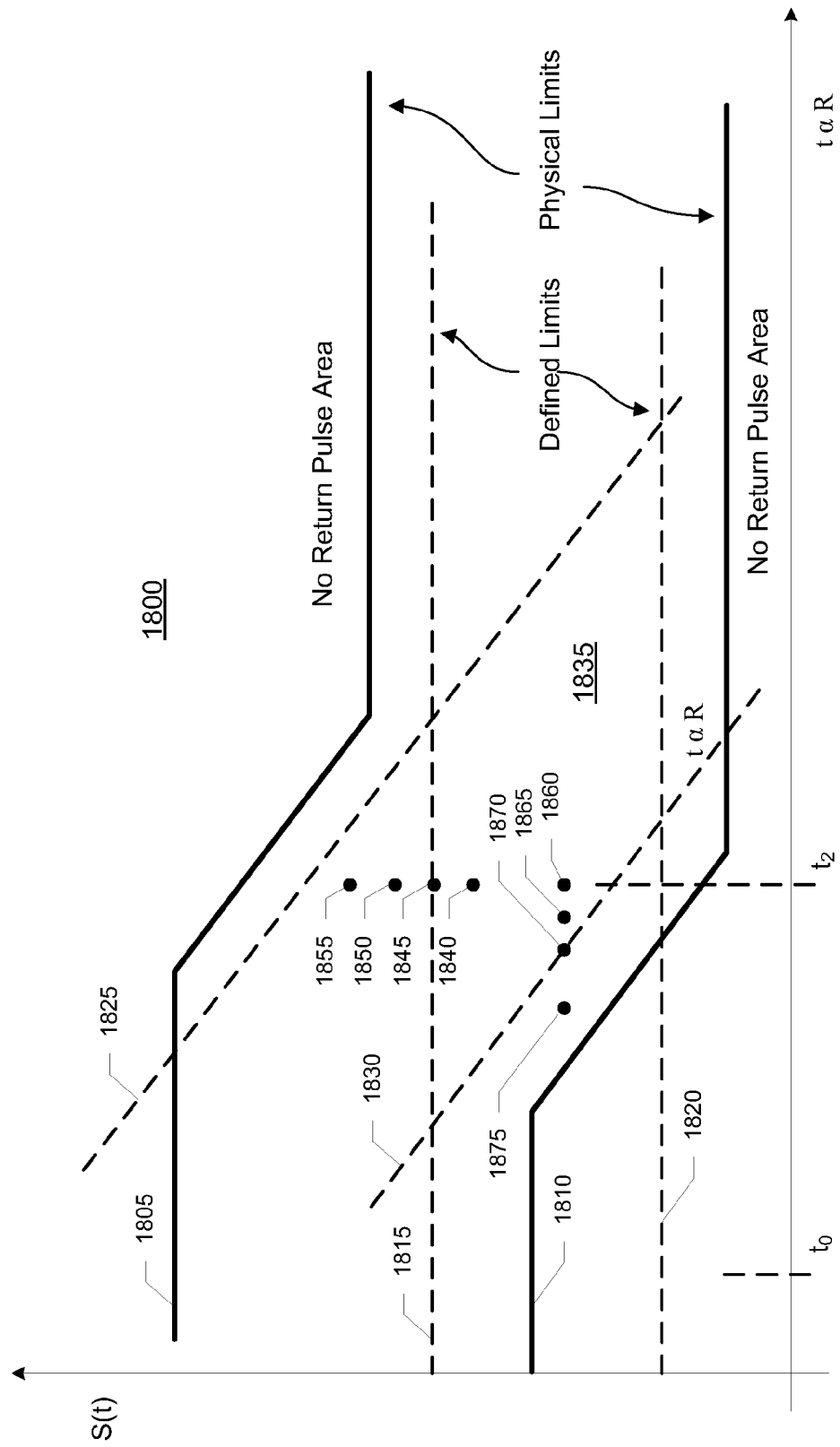
Figure 19:
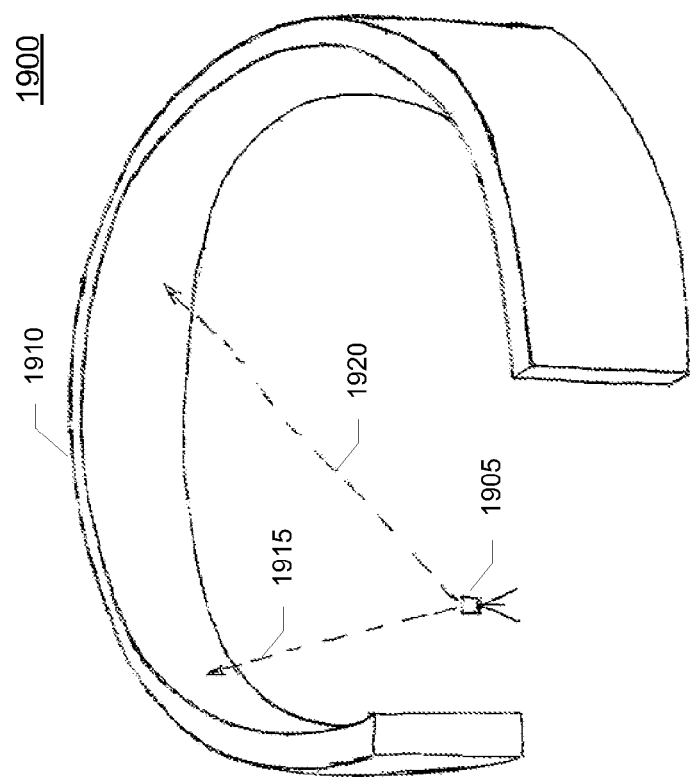
Figure 20:
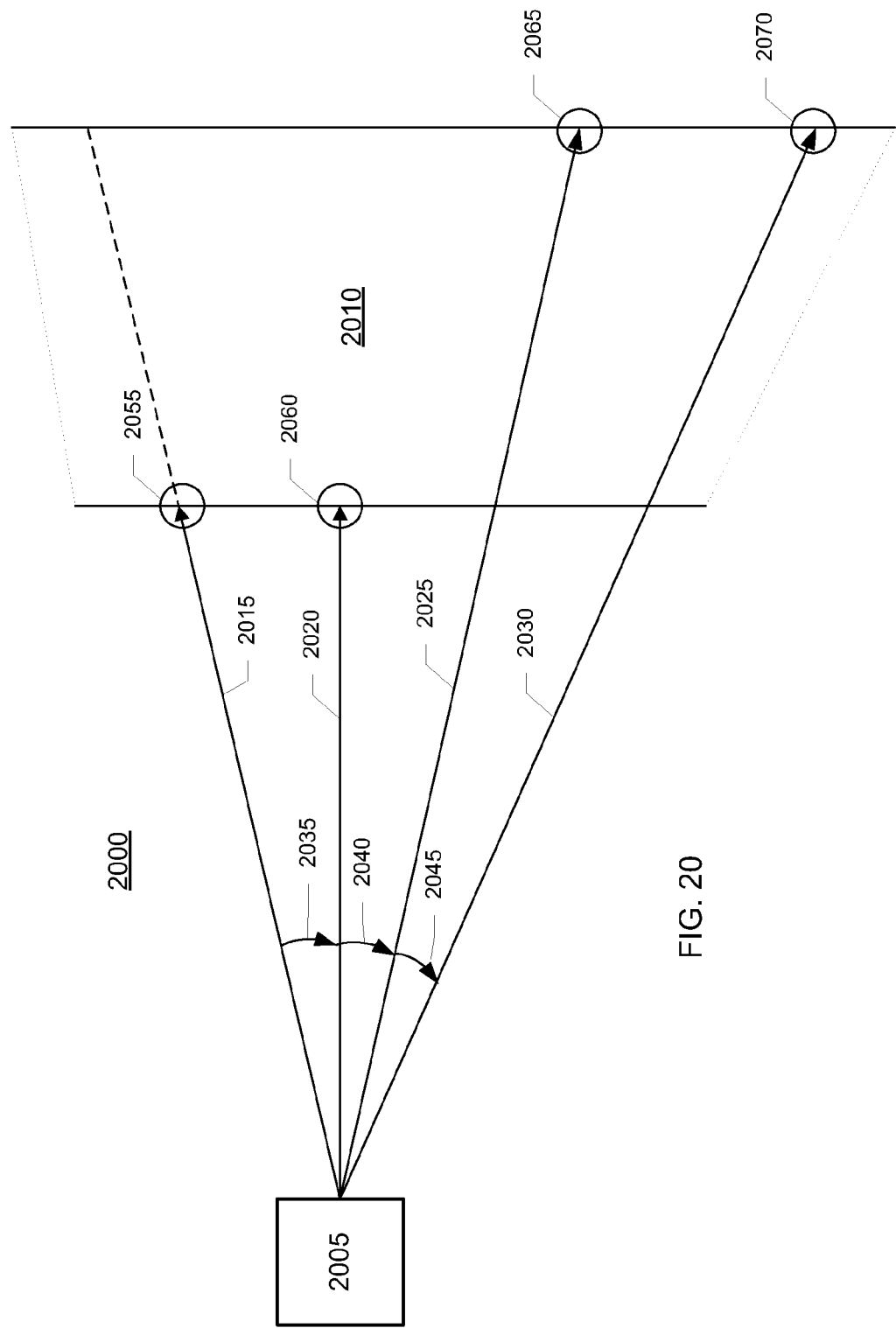
Figure 21:
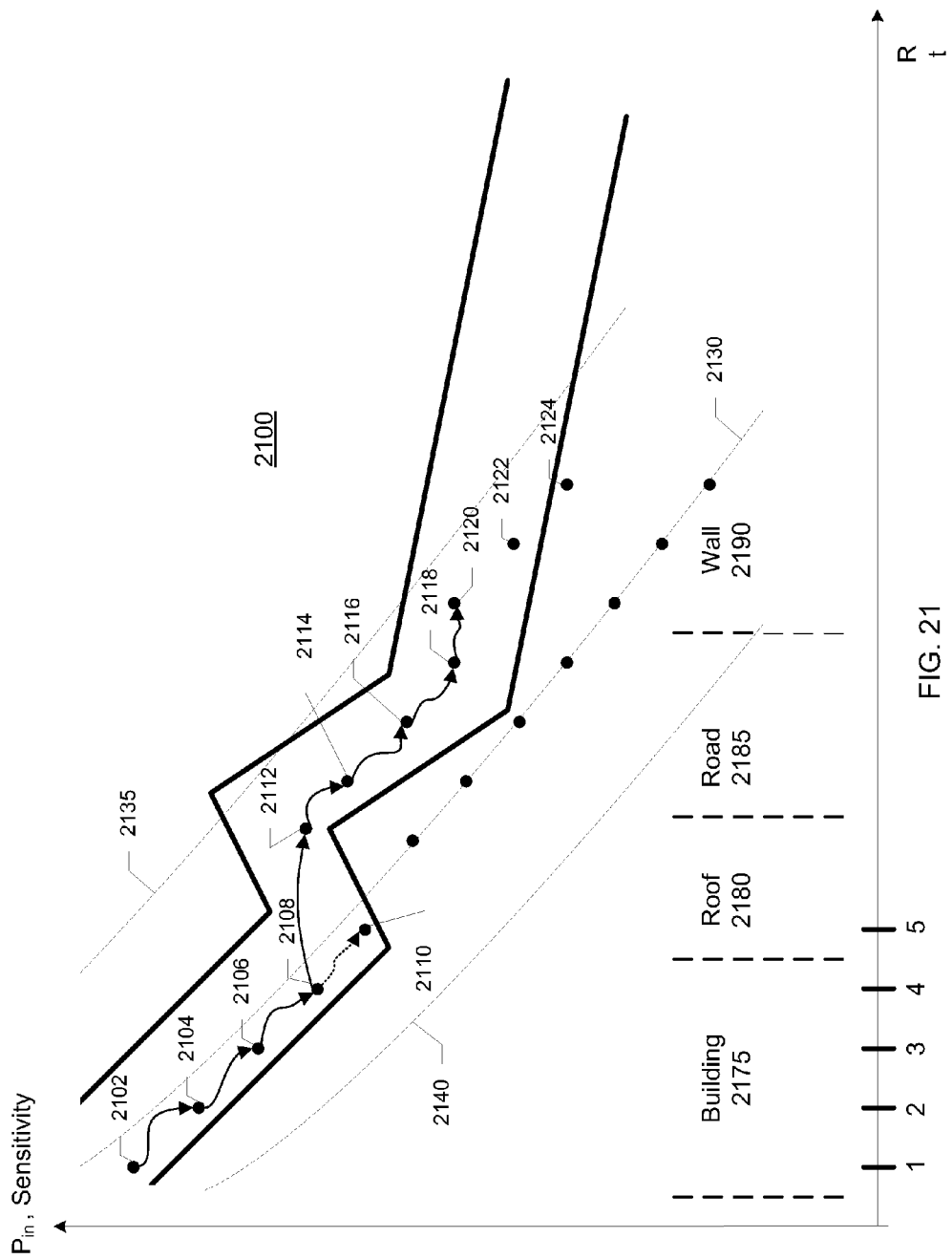

FIG. 7B a shows a further pulse repetition sequence for making a series of distance measurements of a target as a function of power versus time, in accordance with some embodiments of the invention;

FIG. 7C shows a further pulse repetition sequence for making a series of distance measurements of a target as a function of power versus time, in accordance with some embodiments of the invention;

FIG. 7D shows a further pulse repetition sequence for making a series of distance measurements of a target as a function of power versus time, in accordance with some embodiments of the invention;

FIG. 8A shows an example of attenuators having respective attenuation functions in accordance with some embodiments of the invention;

FIG. 8B shows an example of a composite attenuation function in accordance with some embodiments of the invention;

FIG. 9A shows multiple attenuators combined in series, in accordance with some embodiments of the invention;

FIG. 9B shows multiple attenuators combined in parallel, in accordance with some embodiments of the invention;

FIG. 10 schematically illustrates a control system of a scanning device in accordance with some embodiments of the invention;

FIG. 11 shows an example of a well-defined transmitter pulse in accordance with some embodiments of the invention;

FIG. 12A shows an example of a poorly-defined pulse unsuitable for electronic distance measurement;

FIG. 12B shows an example of a poorly-defined pulse unsuitable for electronic distance measurement;

FIG. 13 shows a control and measurement scheme in accordance with some embodiments of the invention;

FIG. 14A shows a detail of FIG. 13 in accordance with some embodiments of the invention;

FIG. 14B shows a detail of FIG. 13 in accordance with some embodiments of the invention;

FIG. 15 shows a variant of the measurement scheme of FIG. 13 in accordance with some embodiments of the invention;

FIG. 16A shows a receiver attenuation function in accordance with some embodiments of the invention;

FIG. 16B shows a receiver attenuation function in accordance with some embodiments of the invention;

FIG. 16C shows a receiver attenuation function in accordance with some embodiments of the invention;

FIG. 17A is a timing diagram of an electronic distance measurement in accordance with some embodiments of the invention;

FIG. 17B illustrates a plot of a receiver sensitivity function versus time in accordance with some embodiments of the invention;

FIG. 18 shows a plot 1800 of receiver sensitivity versus time in accordance with some embodiments of the invention;

FIG. 19 illustrates scanning of the interior of a round wall in accordance with some embodiments of the invention;

FIG. 20 illustrates scanning of a road surface in accordance with some embodiments of the invention; and FIG. 21 shows a plot of return pulse input power versus time for a scanning scenario in accordance with some embodiments of the invention.

DETAILED DESCRIPTION

Figure 1:
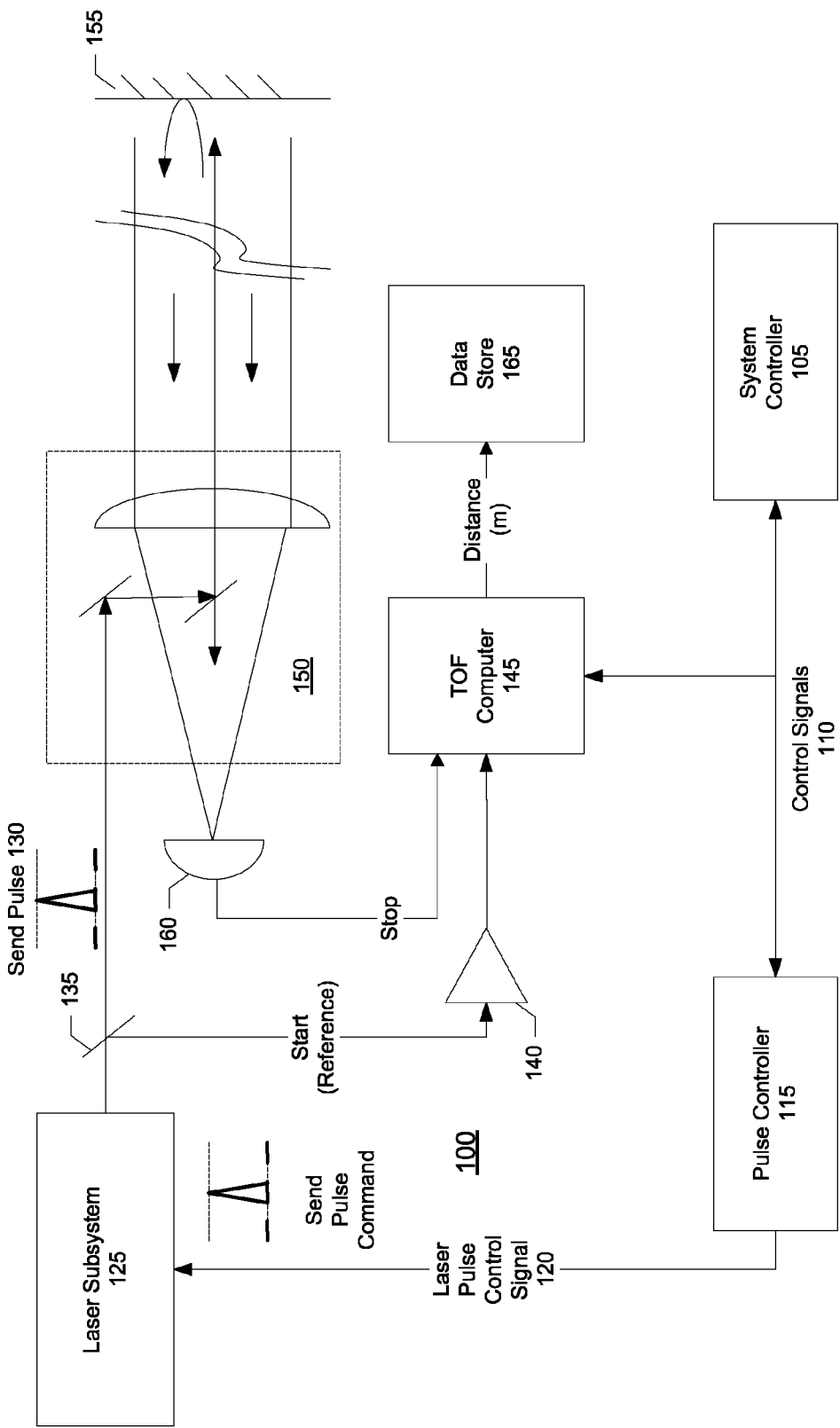

FIG. 1 schematically illustrates a system 100 for implementing a distance measurement scheme in accordance with some embodiments of the invention. A system controller 105 communicates via control signals 110 with a pulse controller 115 and a time-of-flight (TOF) computer 145 to coordinate system operation. System controller 105 issues a control signal 110 to pulse controller 115 to start a measurement. Pulse controller 115 issues a laser pulse control signal 120 to a laser subsystem 125. Laser subsystem 125 responds by emitting a laser send pulse 130. Laser send pulse 130 passes through a splitter 135. A portion of the energy from laser send pulse 130 is passed to a detector element 140 to provide a "start" reference indicating to time-of-flight (TOF) computer 145 the time of emission of laser send pulse 130. A portion of the energy from laser send pulse 130 is passed through an optical subsystem 150 and directed at a target 155 external to the system 100. The return laser pulse sequence from target 155 passes through the optical system 150 to a detector 160. Detector 160 provides a "stop" reference signal indicating to TOF computer 145 the time of detection of the return laser pulse. TOF computer 145 determines a corresponding time of flight for laser pulse 130 and converts the resulting time-of-flight value to a corresponding measurement distance which is, for example, stored in a data store 165. The time-of-flight computer 145 may be a separate processor or may be a process running in a computer which also runs the process of system controller 105 and/or pulse controller 115 and/or other processes. Functionality is described here with reference to particular elements of FIG. 1 for convenience of illustration, but can be combined in one or more elements or assigned to other elements as may be convenient.

FIG. 2 shows a send pulse 205 emitted at a time $t_1$ and the corresponding receive pulse 210 received at time $t_2$. The time interval $\delta t_r = t_2 - t_1$ represents the time of flight of the pulse, corresponding to a measured distance. Although the example of FIG. 2 shows the times $t_1$ and $t_2$ at the peaks of the respective pulses, those of skill in the art will recognize that pulse timing can be determined in other ways, such as a threshold of a leading edge or other characteristic.

FIG. 3A shows at 305 a plot of receive pulse power $P_{in}$ as a function of time of flight of a laser pulse. The plot is not to scale, as in practice only a very small portion of the transmitted pulse energy returns to the receiver. In general the received power decreases with time of flight and thus with distance traveled by the pulse. For a given target and optical system and detector, the receive pulse power is inversely proportional to distance R squared within a range of interest and is thus also inversely proportional to time of flight t squared That is, $P_{in} \propto R^{-2}$. (The receive pulse power goes to infinity at very short distances below the range of interest.) Receive pulse power also varies with albedo of the target from which it is reflected and with other factors such as moisture or dust in the atmosphere through which the pulse travels.

FIG. 3A also shows an albedo corridor 310 defined by the dynamic range of the receiver electronics. Albedo corridor 310 has an upper limit 315 above which the return pulse saturates the receiver electronics and a lower limit 320 below which a return pulse is not detected.

A pulse $R_0$ transmitted at time $t_0$ is reflected from a target and is detected as a receive pulse 325 at a time $t_1$ (corresponding to a distance $R_1$) whose amplitude is within the dynamic range of the detection electronics so that it can be detected and a measured distance can be determined from the time of flight. A receive pulse whose amplitude is greater than the dynamic range of the detection electronics will cause the detection electronics to be saturated so that the arrival time of the receive pulse is indeterminate and thus a measured distance cannot be obtained. A receive pulse whose amplitude is less than the dynamic range of the detection electronics will not be detected by the detection electronics, so that: (1) no arrival time is available to obtain a distance, and (2) ambiguity can arise as to which of a plurality of send pulses the receive pulse corresponds.

Some embodiments in accordance with the invention provide for variable attenuation (or variable gain) over time to compensate the sensitivity of the detection electronics for improved performance. FIG. 3A illustrates conceptually at 305 the desired attenuation of the receiver electronics for a given measurement.

Some embodiments of the invention provide receiver sensitivity which increases with time or, alternately stated, attenuation of the received power wherein the attenuation decreases with time.

FIG. 3B shows at 355 the desired time dependence of attenuation versus time t, such that attenuation of the received power resulting from transmitted pulse $R_0$ decreases with time in proportion to the input power: Attenuation $\alpha \, P_{in}$. The curve 355 of attenuation with time in FIG. 3B in the ideal case matches the curve of input power with time of FIG. 3A.

Figure 4A:
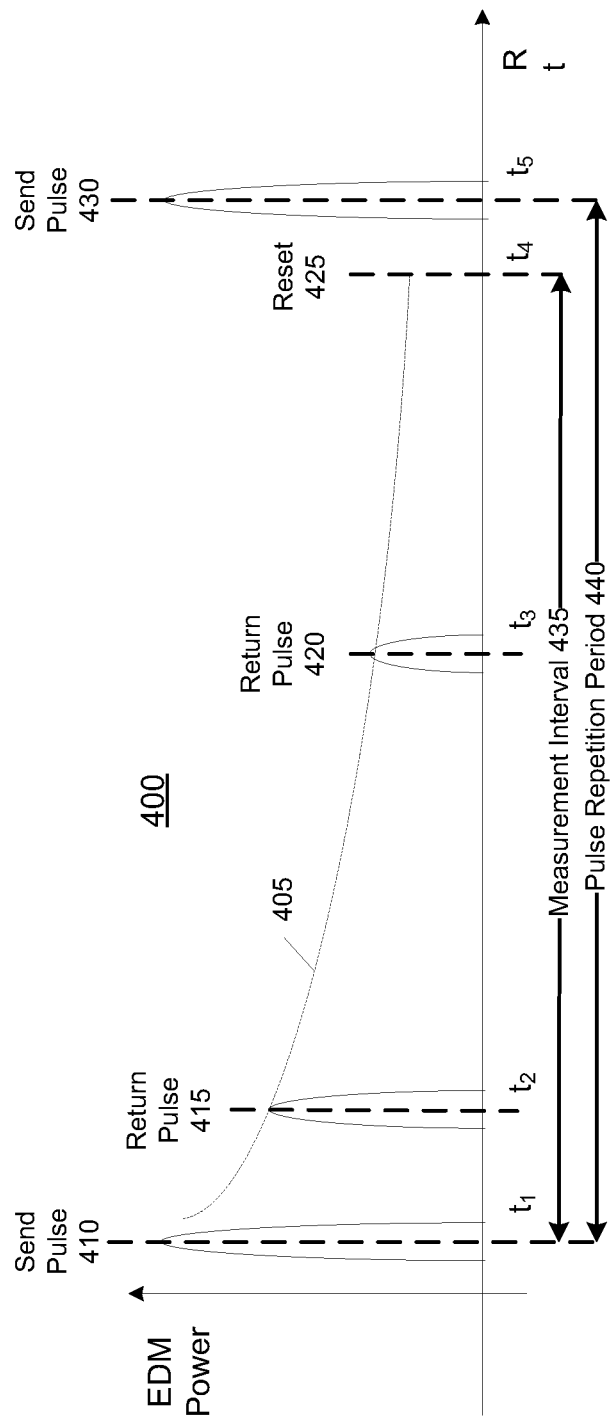
FIG. 4A shows a plot of electronic distance measurement (EDM) power versus time in accordance with some embodiments of the invention.

FIG. 4A shows a plot 405 of electronic distance measurement (EDM) power versus time. A send pulse 410 is transmitted at time $t_1$ and a return pulse 415 or 420 is received respectively at time $t_2$ or at time $t_3$ for example. (Return pulses 415 and 420 assume they are reflected from surfaces having the same albedo.) The receiver electronics are reset at time $t_4$ in preparation for the next send pulse 430 at time $t_5$. The measurement interval 435 is limited by the repetition interval 440 between send pulses. Measurements can be periodic but need not be periodic. For periodic send pulses, the receiver electronics are reset with the same period as the transmitted pulses so as to avoid saturation. See International Patent Publication WO 2010/149219 A1 dated 29 Dec. 2010.

Figure 4B:
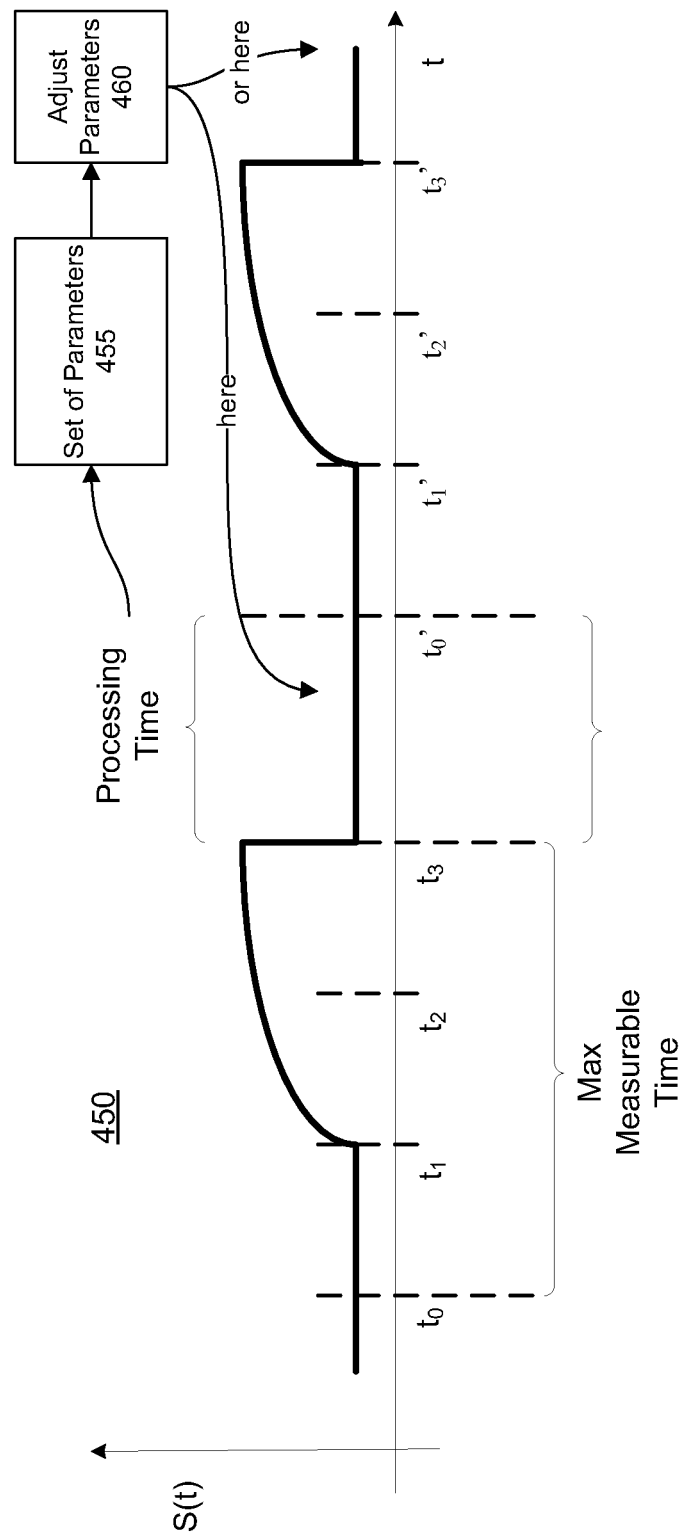
FIG. 4B illustrates a receiver sensitivity function versus time for a sequence of send pulses in accordance with some embodiments of the invention.

FIG. 4B illustrates a receiver sensitivity function 450 versus time for a sequence of send pulses. Receiver sensitivity S(t) is for example for the interval from time $t_1$ until time $t_3$ (also as shown below in FIG. 17B). The interval from time $t_0$ until time $t_3$ represents the maximum measurable time. A further pulse trigger occurs at time $t_0'$. The interval between receiver reset at time $t_3$ and triggering a fresh receiver attenuation function at time $t_0'$ is a processing time during which receiver sensitivity parameters are set at 455 and adjusted at 460 to provide the desired receiver attenuation function for the subsequent measurement interval from time $t_0'$ until time $t_3'$.

For some applications, such as land survey with an EDM-equipped total station, a standardized target is used so that return pulse power is substantially correlated with pulse travel time. Other applications, such as scanning devices used to collect a cloud of measured points, do not have a normalized target. The scanned targets can have different albedos and different inclination angles.

FIG. 5A shows in perspective view a scenario 500 where a section of a road 505 or a wall 510 is to be scanned, where each measurement is at increasing distance, e.g., distance 520 is greater than distance 515 and distance 530 is greater than distance 525. FIG. 5B shows in elevation view the scenario of FIG. 5A.

FIG. 5C (unrelated to the example of FIG. 5A and FIG. 5B) shows an example in which the return pulse 560 reflected from a surface which is oblique to the path of the send pulse is wider and of lower power than the return pulse 555 reflected from a surface which is more nearly normal to the path of the send pulse.

When scanning the interior wall of a building with a scan instrument located inside the building, the send pulse paths may be nearly perpendicular to the wall, as paths 525, 530 relative to wall 510 in FIG. 5A and FIG. 5B, and the return pulses are likely to be tall and well-defined, as pulse 555 in FIG. 5C. When scanning a road with the instrument standing alongside, the send pulse paths may be more oblique to the road surface, as at 515 and 520 in FIG. 5A and FIG. 5B, and the return pulses are more likely to be much lower and wider, as pulse 560 in FIG. 5C.

Figure 6A:
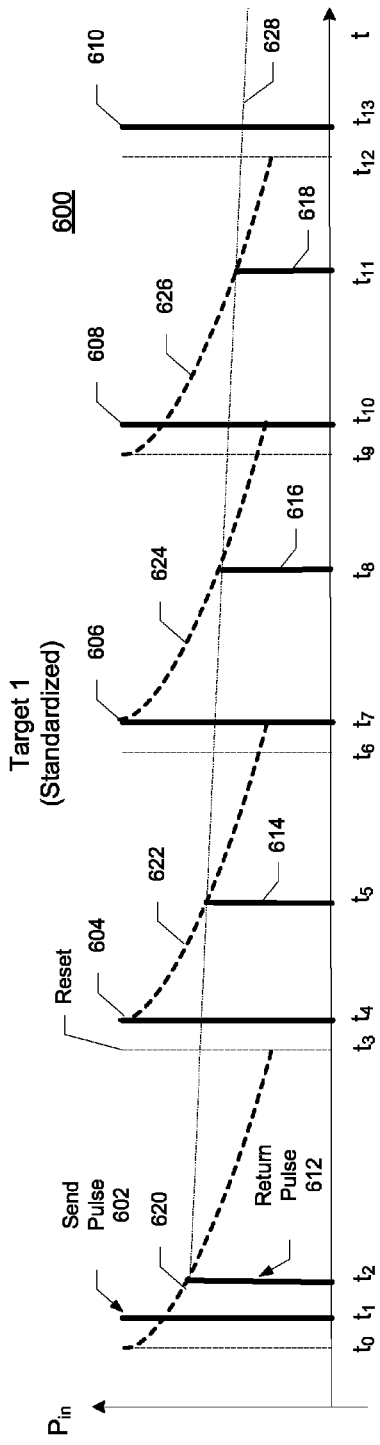
FIG. 6A shows a sequence of send pulses and corresponding return pulses representing a series of distance measurements to a first target as a function of received-pulse power versus time, in accordance with some embodiments of the invention.

FIG. 6A shows a sequence of send pulses and corresponding return pulses representing a series of distance measurements of a first target (Target 1, e.g., a standardized target) as a function of power $P_{in}$ versus time t. Send pulses are transmitted periodically, e.g. send pulse 602 at time $t_1$, send pulse 604 at time $t_4$, send pulse 606 at time $t_7$, send pulse 608 at time $t_{10}$ and send pulse 610 at time $t_{13}$. A return pulse 612 corresponding to send pulse 602 is received at time $t_2$, a return pulse 614 corresponding to send pulse 604 is received at time $t_5$, a return pulse 616 corresponding to send pulse 606 is received at time $t_8$, and a return pulse 618 corresponding to send pulse 608 is received at time $t_{11}$. The attenuation function of the receiver electronics shown at 620 is reset at time $t_3$. The same attenuation function, shown at 622, 624, 626 can be reset respectively at times $t_6$, $t_9$, and $t_{12}$ in anticipation of the subsequent measurement. In this example the attenuation function is suited to obtaining distance measurements from the receive pulses. Dashed trend line 628 is consistent with the use of a standardized target.

Figure 6B:
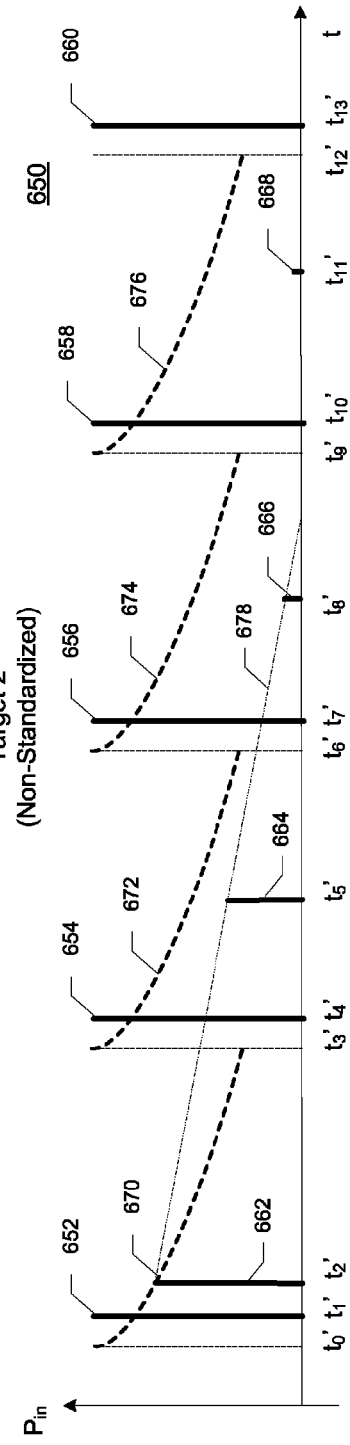
FIG. 6B shows a sequence of send pulses and corresponding return pulses representing a series of distance measurements to a second target as a function of power versus time, in accordance with some embodiments of the invention.

FIG. 6B shows a sequence of send pulses and corresponding return pulses representing a series of distance measurements of a second target (Target 2, e.g., a non-standardized target) as a function of power $P_{in}$ versus time t. Send pulses are transmitted periodically, e.g. send pulse 652 at time $t_1'$, send pulse 654 at time $t_4'$, send pulse 656 at time $t_7'$, send pulse 658 at time $t_{10}'$, and send pulse 660 at time $t_{13}'$. A return pulse 662 corresponding to send pulse 652 is received at time $t_2'$, a return pulse 664 corresponding to send pulse 654 is received at time $t_4'$, a return pulse 666 corresponding to send pulse 656 is received at time $t_8'$, and a return pulse 668 corresponding to send pulse 658 is received at time $t_{11}'$. The attenuation function of the receiver electronics shown at 670 is reset at time $t_3'$. The same attenuation function, shown at 672, 674, 676 can be reset respectively at times $t_6'$, $t_9'$, and $t_{12}'$ in anticipation of the subsequent measurement. Dashed trend line 678 is consistent with measurements of non-standardized reflective surfaces which could be of any objects in an environments such as a wall, where the measurements are of consistent distances but of surfaces with varying albedos—in this example the concept of "target" is broadly defined.

Return pulse amplitude in applications such as scanning is target dependent. Scanning a target with an inappropriate attenuation function can result in the attenuation being too high for distant points. The attenuation function in the example of FIG. 6A has an attenuation level suitable for return pulse 612 of a near target and for return pulse 618 of a distant target. Using the same attenuation function in the example of FIG. 6B has attenuation levels too high to allow detection of the return pulses from the more-distant points, e.g., return pulse 662 is detected but return pulses 664, 666, 668 are not.

Target 2 may have a much different angle of pulse power reduction than Target 1. FIG. 6A shows the return pulse power reduction with range for Target 1 as a slope 628 joining the return pulses. Similarly, FIG. 6B shows the return pulse power reduction with range for Target 2 as a slope 678 joining the return pulses. The vertical distance, if any, between the power level of each return pulse and return pulse power reduction slope shows the mismatch between actual and desired receiver electronics attenuation.

For example, an open pit mine with steep but non-vertical walls may have varying reflectivity of the pulse energy depending on the angle of incidence of the send pulse. The inclination angle of a mine floor is much different than that of the mine walls. For example, the return pulse from the mine floor (such as pulse 560 of FIG. 5C) is wider and of lower power than the return pulse from the mine walls (such as pulse 555 of FIG. 5C).

In accordance with some embodiments of the invention, the pulse is digitized. In accordance with some embodiments, the pulse is digitized and the pulse shape is examined to identify features other than the pulse peak.

Because the return pulse amplitude is target dependent, some embodiments provide for adapting the attenuation function of the receiver electronics to the target. In some embodiments, the attenuation level is controlled to be at a desired level at a certain time following a send pulse.

FIG. 7A shows at 700 a pulse repetition sequence for making a series of distance measurements of a target (e.g. a standardized target such as Target 1 of FIG. 6A) as a function of power versus time t. Send pulses are transmitted sequentially (e.g., periodically): send pulse 702 at time $t_{21}$, send pulse 704 at time $t_{24}$, send pulse 706 at time $t_{27}$, send pulse 708 at time $t_{30}$ and send pulse 710 at time $t_{32}$. A return pulse 712 corresponding to send pulse 702 is received at time $t_{22}$, a return pulse 714 corresponding to send pulse 704 is received at time $t_{25}$, a return pulse 716 corresponding to send pulse 706 is received at time $t_{28}$, and a return pulse 718 corresponding to send pulse 708 is received at time $t_{31}$.

The attenuation function of the receiver electronics shown at 720 has a too-high level to accurately detect receive pulse 712. The receiver electronics can assume that the receive pulse power was below the dynamic range for that period and take this as a cue to change the attenuation level at the corresponding time interval of the next send pulse 704. If the attenuation function were synchronized with the send pulses (as in FIG. 6A for example), the reset would occur at time $t_{23}'$ and the level of attenuation function 722' would be insufficient to detect pulse 714 at time $t_{25}$. Using the information from the previous period, however, the attenuation function in this example is reset at an earlier time $t_{23}$ so that the level of attenuation function 722 is at the proper level to detect pulse 714.

Similarly, if attenuation function 724' were synchronized with send pulse 706 to start at time $t_{26}'$ the level would be incorrect for detecting return pulse 716. Information from one or more previous periods is in this example used to reset the attenuation function at time $t_{26}$ so that the level of attenuation function 724 is at the proper level to detect pulse 716. In like manner, information from one or more previous periods is in this example used to reset the attenuation function 726' at time $t_{29}$ so that the level of attenuation function 726 is at the proper level to detect pulse 718.

Conversely, if the attenuation function (e.g., 720) were at a too-low level so that the receiver electronics were saturated by the receive pulse (e.g., 712), the attenuation function for the succeeding measurement is reset at a later time so that there is less attenuation at the time of detection of the corresponding receive pulse.

In some embodiments, the attenuation function is adapted to the scan. Referring again to FIG. 7A, the attenuation function of the receiver electronics shown at 724' would be at a too-high level to accurately detect receive pulse 716. If the receiver electronics determine in the example of FIG. 7A that the receive pulse power was below the dynamic range for a prior period, this can be taken as a cue to change the attenuation level at the corresponding time interval of a later send pulse such as send pulse 706. As an alternative to changing the reset time, or in addition to changing the reset time, the attenuation function itself can be changed, as will now be described with reference to FIG. 7B.

FIG. 7B shows at 730 a pulse repetition sequence for making a series of distance measurements of a target (e.g. a standardized target such as Target 1 of FIG. 6A) as a function of power $P_{in}$ versus time t. Like items are identified with like reference numerals. As in FIG. 7A, send pulses are transmitted sequentially (e.g., periodically): send pulse 702 at time $t_{21}$, send pulse 704 at time $t_{24}$, send pulse 706 at time $t_{27}$, send pulse 708 at time $t_{30}$ and send pulse 710 at time $t_{32}$. A return pulse 712 corresponding to send pulse 702 is received at time $t_{22}$, a return pulse 714 corresponding to send pulse 704 is received at time $t_{25}$, a return pulse 716 corresponding to send pulse 706 is received at time $t_{28}$, and a return pulse 718 corresponding to send pulse 708 is received at time $t_{31}$.

In FIG. 7B (as in FIG. 7A), the attenuation function of the receiver electronics shown at 720 is at a too-high level to accurately detect receive pulse 712. The receiver electronics can assume that the receive pulse power was below the dynamic range for that period and take this as a cue to change the attenuation level at the corresponding time interval of the next send pulse 704. In contrast to changing the timing of the attenuation function as in FIG. 7A, however, the approach illustrated in FIG. 7B changes the time-decay profile of the attenuation function.

As shown at 730 in FIG. 7B, if the attenuation function 722' were commenced at time $t_{23'}$ before send pulse 704, the attenuation level would not be suitable to detect receive pulse 714. However, information from one or more previous periods is used in this example to modify the attenuation function used for this cycle, so that attenuation function 722" begins at time $t_{23'}$ but decays more rapidly than function 720 and so that attenuation function 722" is at the proper level to enable detection of receive pulse 714 at time $t_{25}$. Similarly, if attenuation function 724' were the same as attenuation function 720, the attenuation level at time $t_{28}$ would not be suitable to detect receive pulse 716. The attenuation function 724" used for detection of receive pulse 716 is commenced at time $t_{26}$ but decays more rapidly than function 724' so that it is at a level suitable to detect pulse 716. Likewise, if attenuation function 726' were the same as attenuation function 720, the attenuation level at time $t_{31}$ would not be suitable to detect receive pulse 718. The attenuation function 726" used for detection of receive pulse 718 is commenced at time $t_{29}$ but decays more rapidly than function 726' so that it is at a level suitable to detect pulse 718.

Conversely, if the attenuation function (e.g., 720) is at a too-low level so that the receiver electronics are saturated by the receive pulse (e.g., 712), the attenuation function for the succeeding measurement is modified so as to decay more slowly so that there is less attenuation at the time of detection of the corresponding receive pulse.

The approaches of FIG. 7A (modifying the start time of the attenuation function) and of FIG. 7B (modifying the time-varying profile of the attenuation function) are not mutually exclusive. In some embodiments these two approaches are used together to achieve a desired attenuation level at an expected time of arrival of a receive pulse (e.g., 712) following a transmit pulse (e.g., 702).

FIG. 7C shows at 740 a pulse repetition sequence for making a series of distance measurements of a target (e.g. a non-standardized target such as Target 2 of FIG. 6B) as a function of power $P_{in}$ versus time t. Send pulses are transmitted sequentially (e.g., periodically): send pulse 742 at time $t_{41}$, send pulse 744 at time $t_{44}$, send pulse 746 at time $t_{47}$, send pulse 748 at time $t_{50}$ and send pulse 740 at time $t_{53}$. A return pulse 752 corresponding to send pulse 742 is received at time $t_{42}$, a return pulse 754 corresponding to send pulse 744 is received at time $t_{45}$, a return pulse 756 corresponding to send pulse 746 is received at time $t_{48}$, and a return pulse corresponding to send pulse 748 expected at time $t_{51}$ is not received.

The attenuation function of the receiver electronics shown at 760 is at a too-high level to accurately detect receive pulse 752. The receiver electronics can assume that the receive pulse power was below the dynamic range for that period and take this as a cue to change the attenuation level at the corresponding time interval of the next send pulse 744. If the attenuation function were synchronized with the send pulses (as in FIG. 6B for example), the reset would occur at time $t_{43'}$ and the level of attenuation function 762' would be insufficient to detect pulse 754 at time $t_{45}$. Using the information from the previous period, however, the attenuation function in this example is reset at an earlier time $t_{43}$ so that the level of attenuation function 762 is at the proper level to detect pulse 754.

Similarly, if attenuation function 764' were synchronized with send pulse 746 to start at time $t_{46'}$ the level would be incorrect for detecting return pulse 756. Information from one or more previous periods is in this example used to reset the attenuation function at time $t_{46'}$ so that the level of attenuation function 764 is at the proper level to detect pulse 756. In like manner, information from one or more previous periods is in this example used to reset the attenuation function 766' at time $t_{49'}$ so that the level of attenuation function 766" is at the proper level to detect an expected return pulse at time $t_{51}$ although, in this case, no return pulse is detected at time $t_{51}$.

Conversely, if the attenuation function (e.g., 760) is at a too-low level so that the receiver electronics are saturated by the receive pulse (e.g., 752), the attenuation function for the succeeding measurement is reset at a later time so that there is less attenuation at the time of detection of the corresponding receive pulse.

In some embodiments, the attenuation function is adapted to the scan. Referring again to FIG. 7C, the attenuation function of the receiver electronics shown at 764' would be at a too-high level to accurately detect receive pulse 756. If the receiver electronics determine in the example of FIG. 7C that the receive pulse power was below the dynamic range for a prior period, this can be taken as a cue to change the attenuation level at the corresponding time interval of a later send pulse such as send pulse 746. As an alternative to changing the reset time, or in addition to changing the reset time, the attenuation function itself can be changed, as will now be described with reference to FIG. 7D.

FIG. 7D shows at 770 a pulse repetition sequence for making a series of distance measurements of a target (e.g. a non-standardized target such as Target 2 of FIG. 6B) as a function of power $P_m$ versus time t. Like items are identified with like reference numerals. As in FIG. 7C, send pulses are transmitted sequentially (e.g., periodically): send pulse 742 at time $t_{41}$, send pulse 744 at time $t_{44}$, send pulse 746 at time $t_{47}$, send pulse 748 at time $t_{50}$ and send pulse 750 at time $t_{53}$. A return pulse 752 corresponding to send pulse 742 is received at time $t_{42}$, a return pulse 754 corresponding to send pulse 744 is received at time $t_{45}$, a return pulse 756 corresponding to send pulse 746 is received at time $t_{48}$, and a return pulse corresponding to send pulse 748 expected at time $t_{51}$ is not received.

In FIG. 7D (as in FIG. 7C), the attenuation function of the receiver electronics shown at 760 is at a too-high level to accurately detect receive pulse 752. The receiver electronics can assume that the receive pulse power was below the dynamic range for that period and take this as a cue to change the attenuation level at the corresponding time interval of the next send pulse 744. In contrast to changing the timing of the attenuation function as in FIG. 7C, however, the approach illustrated in FIG. 7D changes the decay profile of the attenuation function in a manner similar to the example of FIG. 7B.

As shown at 770 in FIG. 7D, if the attenuation function 762' were commenced at time $t_{43'}$ before send pulse 744, the attenuation level would not be suitable to detect receive pulse

754. However, information from one or more previous periods is used in this example to modify the attenuation function used for this cycle, so that attenuation function 762" begins at time $t_{43}$, but decays more rapidly than function 760/762' and is at the proper level to enable detection of receive pulse 754 at time $t_{45}$. Similarly, if attenuation function 764' were the same as attenuation function 760, the attenuation level at time $t_{48}$ would not be suitable to detect receive pulse 756. The attenuation function 764" used for detection of receive pulse 756 is commenced at time $t_{46}$, but decays more rapidly than function 764' so that it is at a level suitable to detect pulse 756. Likewise, if attenuation function 766' were the same as attenuation function 760, the attenuation level at time $t_{51}$ would not be suitable to detect receive pulse 768. The attenuation function 766" used for detection of receive pulse 758 is commenced at time $t_{49}$, but decays more rapidly than function 766' so that it is at a level suitable to detect an expected receive pulse at time at time $t_{51}$ which does not appear as expected (e.g., due to an extremely low albedo target surface or a measurement into the sky with no reflection).

Conversely, if the attenuation function (e.g., 760) is at a too-high level so that the receiver electronics are saturated by the receive pulse (e.g., 752), the attenuation function for the succeeding measurement is modified so as to decay more slowly so that there is less attenuation at the time of detection of the corresponding receive pulse.

The approaches of FIG. 7C (modifying the start time of the attenuation function) and of FIG. 7D (modifying the time-varying profile of the attenuation function) are not mutually exclusive. In some embodiments these two approaches are used together to achieve a desired attenuation level at an expected time of arrival of a receive pulse (e.g., 752) following a transmit pulse (e.g., 742).

How much earlier (or later) to reset the attenuation function can be determined in a variety of ways. In some embodiments, the attenuation function is reset earlier (or later) in predetermined adjustment steps over a plurality of measurement cycles until an appropriate level is obtained. In some embodiments the adjustment steps are in a fixed pattern, such as steps of equal size or steps of progressively increasing (or decreasing) size.

Changing the attenuation function can be implemented in a variety of ways. In some embodiments, multiple attenuation functions are provided, e.g., using attenuation units, and/or amplifiers and/or photodetectors. In some embodiments the multiple attenuation functions are combined to obtain a desired attenuation function for a given measurement. In some embodiments, one or more of the multiple attenuation functions is reset with a fixed period while one or more of the multiple attenuation functions is reset with a variable period to obtain a desired attenuation level at a certain time following a send pulse.

FIG. 8A shows an example of attenuators 805, 815, 825 having respective attenuation functions 810, 820, 830. The functions are combined to obtain a desired attenuation function. In this example, the attenuators can each be individually reset with a respective reset signal and can be combined using respective multipliers (which can be set to zero if desired). If no reset signal is sent to an attenuator, its output remains constant, as shown for example at 835. A function can be shifted timewise using a zero-dB attenuator for example. FIG. 8B shows an example of a composite attenuation function 855 resulting from a combination of attenuation functions 810, 820, 830. An unlimited variety of composite attenuation functions such as 855 can be generated in this manner from a small number of attenuators such as 805, 815, 825.

In some embodiments multiple attenuation functions are combined in series. FIG. 9A shows an example in which attenuators 905 and 910 are combined in series.

In some embodiments multiple attenuation functions are combined in parallel. FIG. 9B shows an example in which attenuators 955 and 960 are combined in parallel.

Variable attenuation in accordance with some embodiments provides one or more benefits such as, for example: more precise measurement of pulse arrival time for improved distance-measurement accuracy; more efficient measurement resulting due to a greater number of measurements over a given period of time; increased band of operation allowing distance measurements over short distances (e.g., 30 cm) and over long distances (e.g., 5 km); enabling automated scanning for different target types without operator intervention; allowing use of a single scanner device for either indoor or outdoor scanning applications; enabling single-pulse measurement in some applications where multi-pulse measurement averaging has typically been used to obtain desired accuracy.

Prior single-pulse measurement techniques often have insufficient accuracy for some applications. For LIDAR application, an error of 3 m or 1 m may be acceptable. Better accuracy is typically needed for ground-based scanning applications, such as a few cm or a few mm for scanning the features of a building. Still better mm accuracy is typically needed for scanning cultural features, monuments, and the like. In some prior-art techniques, multiple-pulses are used and the individual pulse measurements are averaged to improve accuracy.

Some embodiments in accordance with the invention have a receiver with a dynamic range adjustment using an attenuation function.

In some embodiments, the attenuation start time is decoupled from the transmitted pulse start time used to determine time of flight of the pulse; the attenuation function is started earlier (or later) relative to the emission time of the transmitted pulse.

In some embodiments, the attenuation function is variable and/or selectable.

In some embodiments, the period of the transmitted pulses is adjusted. It is typically easier to implement an adjustable pulse period than to change the timing of individual pulses.

In some embodiments, the measurement limits are set manually. For example, a relatively short period is used for a short-range scan to optimize the number of measurements over a given scan interval, while a relatively longer period is used for a long-range scan to avoid ambiguity as to which transmitted pulse corresponds to a given return pulse.

In some embodiments, the send pulses are transmitted non-periodically, at intervals determined from one or more prior measurements. Though implementation can be technically complex (compared to adjusting the period), avoiding limits on whether the interval between transmitted pulse is long or short means that any desired distance can be measured over a wide range of distances.

Receiver sensitivity is adjusted using one or more techniques known in the art, including but not limited to: an electronic attenuator, a variable-gain amplifier, changing bias current of an avalanche photodetector (APD), and/or an optical attenuator which allows changing transparency prior to the detector.

For example, fiber-coupled attenuators designed for telecommunications use are suitably fast, with picosecond response times. In some embodiments a fiber is used prior to the detector (APD), which is compatible with this type of attenuator.

FIG. 10 schematically illustrates a control system 1000 of a scanning device in accordance with some embodiments of the invention. A control and measurement unit 1005 controls a transmitter 1010 via transmit control signals 1015 and transmit trigger signals 1020. Control and measurement unit 1005 also controls a variable-sensitivity receiver 1025 via receiver trigger & reset signals 1030, and reads out data from the receiver via receiver control and readout data signals 1035. Timing measurement is done in the control and measurement unit 1005 in this example.

In some embodiments the transmitter can work at different transmission rates, either with controllable period or non-periodically with each pulse transmitted under individual control. (Power fluctuation of send pulses is a consideration with individually-controlled pulses.) Transmit control signals 1015 determine send pulse parameters and transmit trigger signals 1020 control send pulse timing. Transmitter stability control parameters include bias current to each laser, wavelength control, temperature control, and output power control.

Timing of each pulse is more easily controlled with single-shot measurements. Some embodiments provide controllable send-pulse amplitude, allowing higher power for some applications and lower power for others.

A transmitter of practical design for periodic pulse transmission is described in WO 2011/000411 A1 published 6 Jan. 2011. Its pulse shape does not change with output power and is clean and consistent from pulse to pulse, without spikes, allowing for output power of up to several kW.

A clearly-defined transmitter pulse is desired for electronic distance measurement. (This is in contrast to some other applications such as radar or LIDAR which do not require a precise transmit pulse to obtain desired accuracy.) FIG. 11 shows at 1100 an example of a well-defined transmitter pulse 1105. Artifacts and/or noise in the transmitter pulse, such as represented by dashed lines at 1120, 1125, 1130, are preferably avoided so as to have a stable pulse shape for optimum return pulse reception.

FIG. 12A at 1200 shows an example of a poorly-defined pulse 1205 unsuitable for electronic distance measurement. FIG. 12B schematically illustrates at 1250 an example of a poorly-defined pulse 1255 unsuitable for electronic distance measurement. Numerous such bad examples are documented in the literature.

In some embodiments, timing of the receiver attenuation function is controlled while the send pulses from the transmitter are periodic. In some embodiments the receiver attenuation function is selectable. Some embodiments have more than one attenuation function, each having a respective controllable time offset. Some embodiments combine multiple attenuation functions to adjust the attenuation function to a particular target. Some embodiments have controllable pulse timing, either by changing periodicity of periodic send pulses or by transmitting non-periodic send pulses.

FIG. 13 shows a control and measurement scheme 1300 in accordance with some embodiments to manage the timing of the transmitter and receiver. A mode of operation is selected at 1305, e.g., a set of user-selected constraints. The constraints may be, for example, suited for relatively shorter-distance scanning of a cultural object, or for relatively longer-distance scanning of an open-pit mine. In some embodiments the apparatus selects a mode of operation without user input based upon initial scanning results.

The receiver attenuation functions are reset at 1310. A determination is made at 1315 whether the transmitter is to be started before starting the receiver attenuation function for the next measurement. (The starting order depends on desired timing of the receiver attenuation function relative to the send pulse.) If no, the receiver attenuation function is started at 1320 and the transmitter is then started at 1325. In this case an indication is passed by decision element 1330 to obtain the distance measurement at 1335 from the return pulse taking into account that the attenuation function was started before starting the transmitter. If the determination at 1315 is yes, then the transmitter is started at 1345 and the receive attenuation function is then started at 1350. In this case an indication is passed by decision element 1330 to obtain the distance measurement at 1335 from the return pulse taking into account that the transmitter was started before starting the attenuation function.

A check is made at 1355 whether a desired number N of distance measurements of the same point have been made, where N≥1. (A value of N=1 would produce a single-shot measurement rather than an average of multiple measurements.) If yes, then at 1370 a receiver attenuation function is configured for the next measurement of the point, at 1375 a decision is made about the transmitter (e.g., whether periodic and, if so, the period) and control is returned to step 1310 for the subsequent measurement. If at 1355 the desired number N of measurements has not yet been completed, then at 1360 a repeat measurement is commanded and control returns via 1365 to step 1310 to repeat the measurement.

FIG. 14A shows at 1400 an example in which the decision 1370 for the receive function includes selecting one or more attenuation (sensitivity) functions at 1405 and choosing a time offset at 1410 for each selected attenuation function.

FIG. 14B shows at 1450 an example in which the decision 1375 for the transmitter optionally includes changing at 1455 the send pulse period and optionally selecting at 1460 a non-periodic (single-shot) start of the send pulse.

FIG. 15 shows at 1500 a variant of the measurement scheme of FIG. 13 in which additional information is optionally used at 1560 to reset the receiver functions. In some embodiments, information relevant to setting the receiver functions is obtained as predetermined parameters from a user and/or from other parts of the system. Predetermined parameters from a user can include for example one or more of: weather conditions, an election for multiple-shot measurement averaging for increased accuracy over single-shot measurement, an election for increased/decreased receiver sensitivity based on user knowledge of the target reflectivity, an election for single-shot measurement to obtain a quick scan. Predetermined parameters from other parts of the system can include for example one or more of: limited available system data memory/storage so that a scan is to be completed with fewer measurement points or is to be completed without storing some data (such as scanner head angle of rotation which may be deduced from the number of points per head rotation). Examples of information relevant to resetting the receiver functions include prior scan data, survey data, mapping data, and/or other data from which an approximate range of the target can be obtained or estimated.

Examples of receiver attenuation functions which can be selected for various different targets are shown in FIG. 16A, FIG. 16B and FIG. 16C. FIG. 16A shows a receiver attenuation function 1610 having a first segment 1605 of constant value from time $t_0$ to time $t_1^{A1}$ and a second segment 1610 of linearly decreasing value during an interval from time $t_1^{A1}$ to time $t_2^{A1}$ and a third segment 1615 of constant value from time $t_2^{A1}$ until reset. Function 1610 approximates a function of $1/R^2$, with attenuation level shown here on a logarithmic scale FIG. 16B shows a receiver attenuation function 1630 having a first segment 1635 of constant value from time $t_0$ to time $t_1^{A2}$ and a second segment 1640 of linearly increasing value from time $t_1^{A2}$ to time $t_2^{A2}$ and a third segment 1650 of constant value from time $t_2^{A2}$ until reset. Function 1630 might be suitable for an environment such as a building roof or a round building, e.g., where distance is increasing and signal is increasing such as due to changing incident angles which cause more power in the return pulse.

FIG. 16C shows a receiver attenuation function 1660 formed from a combination of the attenuation functions of FIG. 16A and FIG. 16B, having a first segment 1665 of constant value from time $t_0$ to time $t_1^{A1}$ and a second segment 1670 of linearly decreasing value from time $t_1^{A1}$ to time $t_1^{A2}$ and a third segment 1675 of linearly increasing value from time $t_1^{A2}$ to time $t_2^{A2}$ and a fourth segment 1680 of linearly decreasing value from time $t_2^{A2}$ to time $t_2^{A1}$ and a fifth segment 1685 of constant value from time $t_2^{A1}$ until reset. Function 1660 might be suitable for a complex target, in this example with three different functions in sequence.

FIG. 17A is a timing diagram of an electronic distance measurement in accordance with some embodiments. An electronic trigger pulse 1705 is supplied to the transmitter at time $t_T$ and causes the laser subsystem to transmit a send pulse 1710 at time $t_0$. Send pulse 1710 results in a reference pulse 1715 at time $t_1$. The system has a built-in delay 1720 between trigger pulse 1705 and send pulse 1710, and a time offset 1725 between send pulse 1710 and reference pulse 1715. Return pulse 1735 is received at time $t_2$. The desired pulse travel time 1780 is the interval from $t_0$ to $t_2$.

FIG. 17B illustrates at 1750 a plot of a receiver sensitivity function versus time. Function 1750 encompasses the time offset segment 1755 representing the delay between a trigger pulse at time $t_0$ which initiates a laser pulse emitted at time $t_1$. Function 1750 has an elapsed time segment 1760 during which sensitivity progressively increases from a minimum-sensitivity starting level $S_{min}$ to a level $S(t_2)$. Segment 1760 represents the elapsed time of flight of the laser send pulse emitted at time $t_1$ until it is detected as a return pulse at time $t_2$. Segments 1755 and 1760 together represent the travel time 1780 of the send pulse as determined by the receiver electronics—the time from laser pulse triggering until return pulse detection. Function 1750 has a further segment 1765 during which the sensitivity continues to progressively increase from level $S(t_2)$ to a maximum-sensitivity level $S_{max}$ and remains at level $S_{max}$ until reset 1770 occurs at time $t_3$. The interval from time $t_0$ until time $t_3$ represents the maximum measurable time 1785.

FIG. 18 schematically illustrates a plot 1800 of receiver sensitivity versus time for a send pulse transmitted at time $t_0$ and a return pulse received at time $t_2$. The receiver electronics have a physical upper limit 1805 above which no unsaturated return pulse is detectable and a physical lower limit 1810 below which no return pulse is detectable. A return pulse whose power is outside the region between the physical limits offers little information about how to set the receiver attenuation for the subsequent measurement. Defined limits are therefore set within the region between the physical limits. Defined upper limit 1815 and defined lower limit 1820 are independent with time. Defined upper limit 1825 and defined lower limit 1830 are time-dependent. The bounded region 1835 within the defined limits is the desired operating range of the receiver electronics.

A return pulse with power level 1840 indicates the attenuation level is properly set. A return pulse with power level 1845 is at the defined limit 1815, still measurable but suggesting a need to adjust the receiver attenuation for a subsequent measurement. Return pulses with respective power levels 1850, 1855 are within the physical limits and are measurable, but are outside the defined limit 1815 and thus indicate a need to adjust receiver attenuation for subsequent measurements.

Similarly, return pulses with respective power levels 1860, 1865 indicate the attenuation level is properly set. If these pulses are sequential they indicate a trend suggesting a need to adjust receiver attenuation for subsequent measurements. A return pulse with power level 1870 is at the defined limit 1830, still measurable but suggesting a need to adjust the receiver attenuation for a subsequent measurement. A return pulse with power level 1875 is within the physical limits and is measurable, but is outside the defined limit 1830 and thus indicates a need to adjust receiver attenuation for a subsequent measurement.

Thus, in some embodiments the scan parameters are maintained within a predetermined range. For example, the amplitude of the input signal to the analog-to-digital converter (ADC) which digitizes the return pulses is controlled to avoid reaching a maximum or a minimum level. In some embodiments, this amplitude is maintained with a corridor, e.g., within 20% and 80% of the ADC's range.

The transmitter is started and scanning is performed until the signal amplitude is brought within the desired range: if the amplitude is too high, attenuation is increased; if too low, attenuation is decreased. Scanning continues without changing parameters as long as the return pulse signal amplitude is within range.

Some embodiments use one or more algorithms to predict an expected return pulse time and/or amplitude for use in setting the receiver attenuation function.

For example, scanning of objects can result in a variety of patterns which can be used in setting the attenuation function. FIG. 19 shows an example in which a scanner 1905 scans the interior of a round wall 1910. Scanned from a suitable location inside the structure, the wall is more nearly perpendicular to the path of each send pulse, such as along paths 1915 and 1920, than in the general case of scanning in a random environment.

For example, scanning along a road can result in other patterns which can be used in setting the attenuation function. FIG. 20 shows an example in which a scanner 2005 scans a road surface 2010 along various send pulse paths 2015, 2020, 2025, 2030 at regular angular steps 2035, 2040, 2045, etc., to measure respective points 2055, 2060, 2065, 2070, etc. The road surface 2010 is oblique to the path of each send pulse and the oblique angle changes with each measurement, though possibly in a predictable pattern over a number of send pulses. However, a rotating scanner head will often encounter a similar measurement at the same angular step of each 360-degree rotation of the head. This can result in a series of point measurements which alternate between short and long in a recognizable pattern useful in setting the receiver attenuation function for subsequent measurements.

For example, scanner 2005 may encounter similar measurement conditions at points 2055 and 2060, and/or similar measurement conditions at points 2065 and 2070, and can use trends in the return pulses between similar points to predict the attenuation level required for an expected return pulse. For example, the scanner can use measurement data from point 2055 and other similar points to set the attenuation function for measurement of point 2060, and use measurement data from point 2065 and similar points to set the attenuation function for measurement of point 2070. The prediction can be based in part on the known angular step size of the scanner. The prediction can also be based in part on user input of a prediction hint such as that the scan is of a roadway and thus has certain characteristics useful in the prediction, or the target surface is of a certain type having known or predictable albedo.

In some embodiments, selectable options are provided based on what is to be scanned, e.g., building, road, etc. In some embodiments the options are selectable by a user of a scan device. In some embodiments, the options are selected automatically. In some embodiments, the options are selected based on a pattern of measurements over a plurality of send pulses.

FIG. 21 shows a plot of return pulse input power $P_{in}$ versus time t (corresponding to distance R) for a scanning scenario, overlaid with a plot of receiver sensitivity versus time t. A first sequence of scan points 2102, 2104, 2106, 2108 corresponds to a building 2175, a second sequence of scan points 2110, 2112 corresponds to a roof 2180, a third sequence of scan points 2114, 2116, 2118 corresponds to a road 2185 and a fourth sequence of scan points 2120, 2122, 2124 corresponds to a wall 2190. Line 2130 represents the center and lines 2135, 2140 represent respectively the upper and lower limits of receiver sensitivity.

Arrows between the points indicate the scan sequence. For example, points 2102, 2104, 2106, 2108 corresponds to a building 2175 are scanned in sequence. The pattern is predictable, allowing the receiver attenuation function (receiver sensitivity) to be selected based on one or more preceding measurements. However, the change of target from building 2175 to roof 2180 causes the measurement after point 2108 not to be point 2110 as expected, but rather to be point 2112.

Those of ordinary skill in the art will realize that the detailed description of embodiments of the present invention is illustrative only and is not intended to be in any way limiting. Other embodiments of the present invention will readily suggest themselves to such skilled persons having the benefit of this disclosure.

Reference is made in detail to implementations of the present invention as illustrated in the accompanying drawings. The same reference indicators are used throughout the drawings and the following detailed description to refer to the same or like parts.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. Portions of the methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements, such as filters and banks of filters, can be readily implemented using an object-oriented programming language such that each required filter is instantiated as needed.

Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with an embodiment of the present invention, the methods may be implemented in part on a data processing computer such as a portable computing device, personal computer, workstation computer, mainframe computer, or high-performance server running an operating system such as Microsoft® Windows®, available from Microsoft Corporation of Redmond, Wash., or various versions of the Unix operating system such as Linux available from a number of vendors, or a version of the Android operating system. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

Any of the above-described methods and their embodiments may be implemented in part by means of a computer program. The computer program may be loaded on an apparatus as described above. Therefore, the invention also relates to a computer program, which, when carried out on an apparatus performs portions of any one of the above above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on apparatus already in the field, i.e. a computer program which is delivered to the field as a computer program product. This applies to each of the above-described methods and apparatuses.

Following is a summary of some of the inventive concepts described herein:

1. A method of measuring distances, comprising:
    a. selecting measurement parameters, including
        an attenuation function,
        an attenuation start time,
        an attenuation reset time, and
        an emission time,
    b. transmitting a light pulse at the emission time and starting the attenuation function at the attenuation start time,
    c. detecting if a return pulse is received within a maximum measurable time,
    d. if a return pulse is not received within the maximum measurable time, restarting from step a., and
    e. if a return pulse is received within the maximum measurable time, using at least one characteristic of the return pulse to determine a measured distance, comparing at least one characteristic of the return pulse with at least one defined limit to determine whether to modify at least one of the measurement parameters and, if yes, modifying at least one of the measurement parameters for conducting a further measurement, and conducting the further measurement by repeating steps b., c. and d.

2. The method of 1, wherein the selected emission time is prior to the attenuation start time.

3. The method of 1, wherein the selected emission time is later than the attenuation start time.

4. The method of one of 1-3, wherein if a return pulse which exceeds a detection threshold is detected during the maximum measurable time, modifying at least one of the measurement parameters for conducting a further measurement comprises selecting measurement parameters which will decrease detection sensitivity for conducting the further measurement.

5. The method of 4, wherein selecting measurement parameters which will decrease detection sensitivity comprises changing at least one of the attenuation function and the time offset.

6. The method of one of 1-3, wherein if no return pulse is detected during the maximum measurable time, restarting from step a. comprises selecting measurement parameters which will increase detection sensitivity for conducting a subsequent measurement.

7. The method of 6, wherein selecting measurement parameters which will increase detection sensitivity comprises changing at least one of the attenuation function and the time offset.

8. The method of one of 1-7, wherein using at least one characteristic of the return pulse to determine a measured distance comprises determining a travel time (t2−t0) between the emission time and a return-pulse receive time.

9. The method of one of 1-8, wherein using at least one characteristic of the return pulse to determine a measured distance comprises determining a return-pulse amplitude.

10. The method of one of 1-9, wherein the at least one defined limit comprises at least one of a return-pulse amplitude and an elapsed time between the emission time and a return-pulse receive time.

11. The method of one of 1-10, wherein comparing at least one characteristic of the return pulse with at least one defined limit comprises determining a feature of the at least one defined limit from multiple prior measurements.

12. The method of 11, wherein determining a feature of the at least one defined limit from multiple prior measurements comprises extrapolating an approximation function from the multiple prior measurements.

13. The method of 12, wherein the approximation function is determined as an average of multiple prior measurement values.

14. The method of 12-13, wherein the approximation function comprises one of a straight line function, an exponential function, and a periodic function.

15. The method of one of 1-14, wherein modifying at least one of the measurement parameters comprises determining one of an optimal set of measurement parameters and an acceptable set of measurement parameters.

16. The method of 15, wherein determining an optimal set of measurement parameters comprises determining at least one measurement parameter lying near a mid-point of a range.

17. The method of 15, wherein determining an acceptable set of measurement parameters comprises determining at least one measurement parameter lying within a range.

18. The method of one of 1-17, wherein the emission time is determined such that the measurement is one of a plurality of periodic measurements.

19. The method of one of 1-17, wherein the emission time is determined such that the measurement is one of a plurality of non-periodic measurements.

20. Apparatus for measuring distances, comprising at least one controller, a laser subsystem, and a time-of-flight computer, wherein the apparatus is adapted to
a. select measurement parameters, including
an attenuation function,
an attenuation start time,
an attenuation reset time, and
an emission time,
b. transmit a light pulse at the emission time and start the attenuation function at the attenuation start time,
c. detect if a return pulse is received prior to the attenuation reset time,
d. if a return pulse is not received prior to the attenuation reset time, restart from step a., and
e. if a return pulse is received prior to the attenuation reset time, use at least one characteristic of the return pulse to determine a measured distance, comparing at least one characteristic of the return pulse with at least one defined limit to determine whether to modify at least one of the measurement parameters and, if yes, modify at least one of the measurement parameters for conducting a further measurement, and conduct the further measurement by repeating steps b. c. and d.

21. The apparatus of 20, wherein the selected emission time is prior to the attenuation start time.

22. The apparatus of 20, wherein the selected emission time is later than the attenuation start time.

23. The apparatus of one of 20-22, further adapted to determine if a return pulse which exceeds a detection threshold is detected during the maximum measurable time and, if yes, to modify at least one of the measurement parameters for conducting a further measurement by selecting measurement parameters which will decrease detection sensitivity for conducting the further measurement.

24. The apparatus of 23, wherein selecting measurement parameters which will decrease detection sensitivity comprises changing at least one of the attenuation function and the time offset.

25. The apparatus of one of 20-22, further adapted to determine if no return pulse is detected during a maximum measurable time and, if yes, to modify at least one of the measurement parameters so as to increase detection sensitivity for conducting a subsequent measurement.

26. The apparatus of 25, wherein modifying at least one measurement parameter so as to increase detection sensitivity comprises changing at least one of the attenuation function and the time offset.

27. The apparatus of one of 20-26, wherein to use at least one characteristic of the return pulse to determine a measured distance comprises determining a travel time (t2−t0) between the emission time and a return-pulse receive time.

28. The apparatus of one of 20-27, wherein to use at least one characteristic of the return pulse to determine a measured distance comprises determining a return-pulse amplitude.

29. The apparatus of one of 20-28, wherein the at least one defined limit comprises at least one of a return-pulse amplitude and an elapsed time between the emission time and a return-pulse receive time.

30. The apparatus of one of 20-29, wherein to compare at least one characteristic of the return pulse with at least one defined limit comprises determining a feature of the at least one defined limit from multiple prior measurements.

31. The apparatus of 30, wherein determining a feature of the at least one defined limit from multiple prior measurements comprises extrapolating an approximation function from the multiple prior measurements.

32. The apparatus of 31, wherein the approximation function is determined as an average of multiple prior measurement values.

33. The apparatus of one of 31-32, wherein the approximation function comprises one of a straight line function, an exponential function, and a periodic function.

34. The apparatus of one of 20-33, wherein modifying at least one of the measurement parameters comprises determining one of an optimal set of measurement parameters and an acceptable set of measurement parameters.

35. The apparatus of 34, wherein determining an optimal set of measurement parameters comprises determining a set of measurement parameters lying near a mid-point of at least one range.

36. The apparatus of 34, wherein determining an acceptable set of measurement parameters comprises determining a set of measurement parameters lying within at least one range.

37. The apparatus of one of 20-36, wherein the emission time is determined such that the measurement is one of a plurality of periodic measurements.

38. The apparatus of one of 20-36, wherein the emission time is determined such that the measurement is one of a plurality of non-periodic measurements.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method of measuring distances, comprising:
   a. selecting measurement parameters, including
      an attenuation function, and
      an attenuation start time relative to an emission time,
   b. transmitting a light pulse at the emission time and starting the attenuation function at the attenuation start time,
   c. detecting if a return pulse is received within a maximum measurable time,
   d. if a return pulse is not received within the maximum measurable time, restarting from step a., and
   e. if a return pulse is received within the maximum measurable time, using at least one characteristic of the return pulse to determine a measured distance, comparing at least one characteristic of the return pulse with at least one defined limit to determine whether to modify at least one of the attenuation function or the attenuation start time relative to the emission time and, when determined, modifying at least one of the attenuation function or the attenuation start time relative to the emission time for conducting a further measurement, and conducting the further measurement by repeating steps b., c. and d.

2. The method of claim 1, wherein the selected emission time is prior to the attenuation start time.

3. The method of claim 1, wherein the selected emission time is later than the attenuation start time.

4. The method of claim 1, wherein if a return pulse which exceeds a detection threshold is detected during the maximum measurable time, modifying at least one of the attenuation function or the attenuation start time relative to the emission time for conducting a further measurement comprises selecting the attenuation function or the attenuation start time relative to the emission time which will decrease detection sensitivity for conducting the further measurement.

5. The method of claim 4, wherein selecting the attenuation function or the attenuation start time relative to the emission time which will decrease detection sensitivity comprises changing the attenuation function and the attenuation start time relative to the emission time.

6. The method of claim 1, wherein if no return pulse is detected during the maximum measurable time, restarting from step a. comprises selecting the attenuation function or the attenuation start time relative to the emission time which will increase detection sensitivity for conducting a subsequent measurement.

7. The method of claim 6, wherein selecting the attenuation function or the attenuation start time relative to the emission time which will increase detection sensitivity comprises changing the attenuation function and the attenuation start time relative to the emission time.

8. The method of claim 1, wherein using at least one characteristic of the return pulse to determine a measured distance comprises determining a travel time (t2-t0) between the emission time and a return-pulse receive time.

9. The method of claim 1, wherein using at least one characteristic of the return pulse to determine a measured distance comprises determining a return-pulse amplitude.

10. The method of claim 1, wherein the at least one defined limit comprises at least one of a return-pulse amplitude and an elapsed time between the emission time and a return-pulse receive time.

11. The method of claim 1, wherein comparing at least one characteristic of the return pulse with at least one defined limit comprises determining a feature of the at least one defined limit from multiple prior measurements.

12. The method of claim 11, wherein determining a feature of the at least one defined limit from multiple prior measurements comprises extrapolating an approximation function from the multiple prior measurements.

13. The method of claim 12, wherein the approximation function is determined as an average of multiple prior measurement values.

14. The method of claim 12, wherein the approximation function comprises one of a straight line function, an exponential function, and a periodic function.

15. The method of claim 1, wherein modifying at least one of the attenuation function or the attenuation start time relative to the emission time comprises determining one of an optimal set of measurement parameters and an acceptable set of measurement parameters, where determining the optimal set of measurement parameters comprises determining at least one measurement parameter near a mid-point of a range, and determining the acceptable set of measurement parameters comprises determining at least one measurement parameter within the range.

16. The method of claim 1, wherein the emission time is determined such that the measurement is one of a plurality of periodic measurements.

17. The method of claim 1, wherein the emission time is determined such that the measurement is one of a plurality of non-periodic measurements.

18. Apparatus for measuring distances, comprising at least one controller, a laser subsystem, and a time-of-flight computer, wherein the apparatus is operative to
   a. select measurement parameters, including
      an attenuation function, and
      an attenuation start time relative to an emission time, b. transmit a light pulse at the emission time and start the attenuation function at the attenuation start time, c. detect if a return pulse is received within a maximum measureable time, d. if a return pulse is not received within the maximum measureable time, restart from step a., and e. if a return pulse is received within the maximum measureable time, use at least one characteristic of the return pulse to determine a measured distance, compare at least one characteristic of the return pulse with at least one defined limit to determine whether to modify at least one of the attenuation function or the attenuation start time relative to the emission time and, when determined, modify at least one of the attenuation function or the attenuation start time relative to the emission time for conducting a further measurement, and conduct the further measurement by repeating steps b. c. and d.

19. The apparatus of claim 18, wherein the selected emission time is prior to the attenuation start time.

20. The apparatus of claim 18, wherein the selected emission time is later than the attenuation start time.

21. The apparatus of claim 18, further adapted to determine if a return pulse which exceeds a detection threshold is detected during the maximum measurable time and, if yes, to modify at least one of the attenuation function or the attenuation start time relative to the emission time for conducting a further measurement by selecting the attenuation function or the attenuation start time relative to the emission time which will decrease detection sensitivity for conducting the further measurement.

22. The apparatus of claim 21, wherein selecting the attenuation function or the attenuation start time relative to the emission time which will decrease detection sensitivity comprises changing at least one of the attenuation function and the attenuation start time relative to the emission time.

23. The apparatus of claim 18, further adapted to determine if no return pulse is detected during a maximum measurable time and, if yes, to modify at least one of the attenuation function or the attenuation start time relative to the emission time so as to increase detection sensitivity for conducting a subsequent measurement.

24. The apparatus of claim 23, wherein modifying at least one of the attenuation function or the attenuation start time relative to the emission time so as to increase detection sensitivity comprises changing at least one of the attenuation function and the attenuation start time relative to the emission time.

25. The apparatus of claim 18, wherein to use at least one characteristic of the return pulse to determine a measured distance comprises determining a travel time (t2-t0) between the emission time and a return-pulse receive time.

26. The apparatus of claim 18, wherein to use at least one characteristic of the return pulse to determine a measured distance comprises determining a return-pulse amplitude.

27. The apparatus of claim 18, wherein the at least one defined limit comprises at least one of a return-pulse amplitude and an elapsed time between the emission time and a return-pulse receive time.

28. The apparatus of claim 18, wherein to compare at least one characteristic of the return pulse with at least one defined limit comprises determining a feature of the at least one defined limit from multiple prior measurements.

29. The apparatus of claim 28, wherein determining a feature of the at least one defined limit from multiple prior measurements comprises extrapolating an approximation function from the multiple prior measurements.

30. The apparatus of claim 29, wherein the approximation function is determined as an average of multiple prior measurement values.

31. The apparatus of claim 29, wherein the approximation function comprises one of a straight line function, an exponential function, and a periodic function.

32. The apparatus of claim 18, wherein modifying at least one of the attenuation function or the attenuation start time relative to the emission time comprises determining one of an optimal set of measurement parameters and an acceptable set of measurement parameters, where determining the optimal set of measurement parameters comprises determining at least one measurement parameter near a mid-point of a range, and determining the acceptable set of measurement parameters comprises determining at least one measurement parameter within the range.

33. The apparatus of claim 18, wherein the emission time is determined such that the measurement is one of a plurality of periodic measurements.

34. The apparatus of claim 18, wherein the emission time is determined such that the measurement is one of a plurality of non-periodic measurements.

* * * * *